(12) United States Patent
Yamakawa et al.

(10) Patent No.: US 7,474,451 B2
(45) Date of Patent: Jan. 6, 2009

(54) OPTICAL SCANNING DEVICE, IMAGE FORMING APPARATUS, AND METHOD OF REDUCING NOISES IN OPTICAL SCANNING DEVICE

(75) Inventors: Takeshi Yamakawa, Tokyo (JP); Hiroshi Yoshizawa, Tokyo (JP); Masanori Namba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 11/334,550

(22) Filed: Jan. 19, 2006

(65) Prior Publication Data

US 2006/0209376 A1 Sep. 21, 2006

(30) Foreign Application Priority Data

Mar. 16, 2005 (JP) .............................. 2005-076022
Jul. 22, 2005 (JP) .............................. 2005-213154

(51) Int. Cl.
*G02B 26/08* (2006.01)
(52) U.S. Cl. ........................ 359/216; 359/201; 359/203; 359/204
(58) Field of Classification Search ........................ None
See application file for complete search history.

(56) References Cited

U.S. PATENT DOCUMENTS

| | | | | |
|---|---|---|---|---|
| 6,424,447 B1 * | 7/2002 | Kaneko et al. | ............... | 359/216 |
| 6,829,001 B2 * | 12/2004 | Yamakawa | ............... | 347/261 |
| 7,050,082 B2 * | 5/2006 | Suzuki et al. | ............... | 347/241 |
| 7,057,780 B2 * | 6/2006 | Yoshizawa | .................. | 359/204 |
| 7,072,087 B2 * | 7/2006 | Nakahata | ..................... | 359/204 |
| 2004/0246553 A1 * | 12/2004 | Yoshizawa | .................. | 359/216 |
| 2006/0187513 A1 * | 8/2006 | Ohsugi | ....................... | 359/212 |

FOREIGN PATENT DOCUMENTS

| | | |
|---|---|---|
| JP | 2002-162592 | 6/2002 |
| JP | 2002-196269 | 7/2002 |
| JP | 2003-185954 | 7/2003 |
| JP | 2003-202512 | 7/2003 |
| JP | 2003-255254 | 9/2003 |

* cited by examiner

*Primary Examiner*—Stephone B. Allen
*Assistant Examiner*—Jade Callaway
(74) *Attorney, Agent, or Firm*—Oblon, Spivak, McClelland, Maier & Neustadt, P.C.

(57) ABSTRACT

An optical scanning device includes a deflector that deflects light fluxes emitted from light sources and rotates in a first direction, optical systems that direct deflected light fluxes onto subject surfaces, and a member that prevents a flare beam reflected by one of the optical systems from entering another one of the optical systems. The deflector includes first edges in the first direction and the member includes second edges arranged in a second direction perpendicular to the first direction. The second edges are out of alignment with each other in the first direction so that a first edge does not pass all of the second edges simultaneously.

23 Claims, 22 Drawing Sheets

OPTICAL SCANNING DEVICE, IMAGE FORMING APPARATUS, AND METHOD OF REDUCING NOISES IN OPTICAL SCANNING DEVICE

CROSS-REFERENCE TO RELATED APPLICATIONS

The present document incorporates by reference the entire contents of Japanese priority document, 2005-076022 filed in Japan on Mar. 16, 2005 and 2005-213154 filed in Japan on Jul. 22, 2005.

BACKGROUND OF THE INVENTION

1. Field of the Invention

The present invention relates to an optical scanning device for writing latent images onto image holding members and a method for reducing noises in an optical scanning device.

2. Description of the Related Art

In a tandem color image forming apparatus, latent images are generally written onto four image holding members (e.g. photosensitive drums) disposed next to one another by irradiating them with light beams emitted from a plurality of light sources. The latent images are then developed into visible images with developers for different colors (e.g. toners in yellow, cyan, magenta, and black). Subsequently, a recording medium such as a recording paper held by a transferring belt is sequentially conveyed to a transferring unit of each of the image holding members so that the visible images in the different colors are superposed onto the transferring member. Finally, the images are fixed on the transferring member so that a multi-colored image is obtained.

In such a tandem color image forming apparatus, there is a conventionally-known technique to write latent images onto each image holding member individually by using optical scanning devices provided for each of the image holding members. However, such optical scanning devices that include a deflector (hereinafter also referred to as an optical deflector) that includes a polygon mirror and a motor for driving the polygon mirror are relatively expensive. Therefore, it is expensive to individually provide optical scanning devices for each of the image holding members.

In addition, it requires a large space to install as many optical scanning devices each including the same number of optical deflectors as that of the image holding members, which leads to a larger image forming apparatus.

In order to reduce the costs and the size of the tandem color image forming apparatus, a conventional optical scanning device includes a single optical deflector used commonly by a plurality of light sources, so that light beams emitted from the light sources are simultaneously deflected and scanned with the single optical deflector.

When scanning and image forming optical systems are disposed symmetrically on both sides of an optical deflector so that a single optical deflector can separate a plurality of light beams into two symmetrical directions and deflect and scan the light beams, a problem of flare beams emitted from the optical systems arises.

For example, when a light beam is reflected and scattered on the incident surfaces of image forming lenses that are opposed to each other on either side of an optical deflector positioned there between, the light beam reflected and scattered (called a flare beam) travels in the opposite direction so as to enter the optical system on the opposite side. Consequently, the flare beam that has entered the opposite optical system is irradiated onto one or more of the image holding members via the optical system.

If a flare beam is reflected onto an image holding member, it may cause stripe smudges or a ghost image in the resultant image, or sometimes it may cause smudges in the background or blurring of colors because of duplication of flare beams. Thus, flare beams significantly degrade the image quality.

Japanese Patent Application Laid Open No. 2002-196269 discloses an arrangement in which a light shielding member that is a flat plate and is used for shielding flare beams is disposed at a position close to a deflection surface of an optical deflector.

Japanese Patent Application Laid Open No. 2002-196269 also discloses a technique by which the light shielding member is placed so as to be out of alignment from a position on a line that orthogonally intersects the rotation center of the optical deflector and the positional directions of the optical systems, toward the downstream side of the rotation direction of the optical deflector, in order to reduce occurrence of noises including whistling noise that is caused when there is not enough distance between the optical deflector that rotates at a high speed and the light shielding member. Similar techniques are disclosed also in the Japanese Patent Application Laid Open No. 2003-185954, No. 2002-162592, No. 2003-202512, and No. 2003-255254.

In an optical scanning device that uses the oppositional scanning method as described above, because of the characteristics related to how the scanning and image forming optical systems are positioned, it is required to dispose a flare beam shielding member extremely closely to the optical deflector in order to efficiently shield flare beams.

However, when the flare beam shielding member is disposed extremely close to the optical deflector that performs deflection at a high-speed, noises increase, abnormal sounds are caused, and the temperature also rises. In some cases, deflection stability may be lowered.

Conventional techniques have not been able to achieve satisfactory results in terms of reducing side effects including noises.

In the above example, a flare beam shielding member is disposed close to an optical deflector; however, there might be a need to provide another unit other than the flare beam shielding member close to the optical deflector due to the layout of the optical scanning device. In such a case, a similar problem will arise.

SUMMARY OF THE INVENTION

It is an object of the present invention to at least solve the problems in the conventional technology.

According to an aspect of the present invention, an optical scanning device includes a deflector that deflects a light flux emitted from a light source, the deflector being rotatable in a first direction and including a plurality of deflection surfaces and a plurality of first edges between the deflection surfaces, an optical system that directs deflected light flux onto a subject surface, and a member disposed close to the deflector, the member including a plurality of second edges arranged in a second direction perpendicular to the first direction, wherein the second edges are out of alignment with each other in the first direction so that a first edge does not pass all of the second edges simultaneously.

According to another aspect of the present invention, an optical scanning device includes a deflector that deflects a light flux emitted from a light source, the deflector being rotatable in a first direction and including a plurality of deflection surfaces and a plurality of first edges between the deflection surfaces, an optical system that directs deflected light flux onto a subject surface, and a member disposed close to the deflector, the member including a plurality of second edges arranged in a second direction perpendicular to the first direction, wherein the first edges and the second edges are arranged so that the first edges do not pass the second edges with a substantially constant distance there between in the first direction.

According to still another aspect of the present invention, an optical scanning device includes a deflector that deflects a light flux emitted from a light source, the deflector being rotatable in a first direction and including a plurality of deflection surfaces and a plurality of first edges between the deflection surfaces, an optical system that directs deflected light flux onto a subject surface, and a member disposed close to the deflector, the member including a plurality of second edges arranged in a second direction perpendicular to the first direction, wherein at least one of the second edges is inclined so as to be substantially parallel to a first edge so that a first edge does not pass all of the second edges simultaneously.

According to still another aspect of the present invention, a method reduces noises in an optical scanning device, the optical scanning device including a deflector being rotatable in a first direction and including a plurality of deflection surfaces and a plurality of first edges between the deflection surfaces, and a member disposed close to the deflector, the member including a plurality of second edges arranged in a second direction perpendicular to the first direction, wherein the second edges are out of alignment with each other in the first direction so that a first edge does not pass all of the second edges simultaneously.

According to still another aspect of the present invention, a method reduces noises in an optical scanning device, the optical scanning device including a deflector being rotatable in a first direction and including a plurality of deflection surfaces and a plurality of first edges between the deflection surfaces, and a member disposed close to the deflector, the member including a plurality of second edges arranged in a second direction perpendicular to the first direction, wherein the first edges and the second edges are arranged so that the first edges do not pass the second edges with a substantially constant distance there between in the first direction.

According to still another aspect of the present invention, a method reduces noises in an optical scanning device, the optical scanning device including a deflector being rotatable in a first direction and including a plurality of deflection surfaces and a plurality of first edges between the deflection surfaces, and a member disposed close to the deflector, the member including a plurality of second edges arranged in a second direction perpendicular to the first direction, wherein at least one of the second edges is inclined so as to be substantially parallel to a first edge so that a first edge does not pass all of the second edges simultaneously.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

A first embodiment according to the present invention will be explained with reference to FIGS. 1 through 13.

Figure 2:
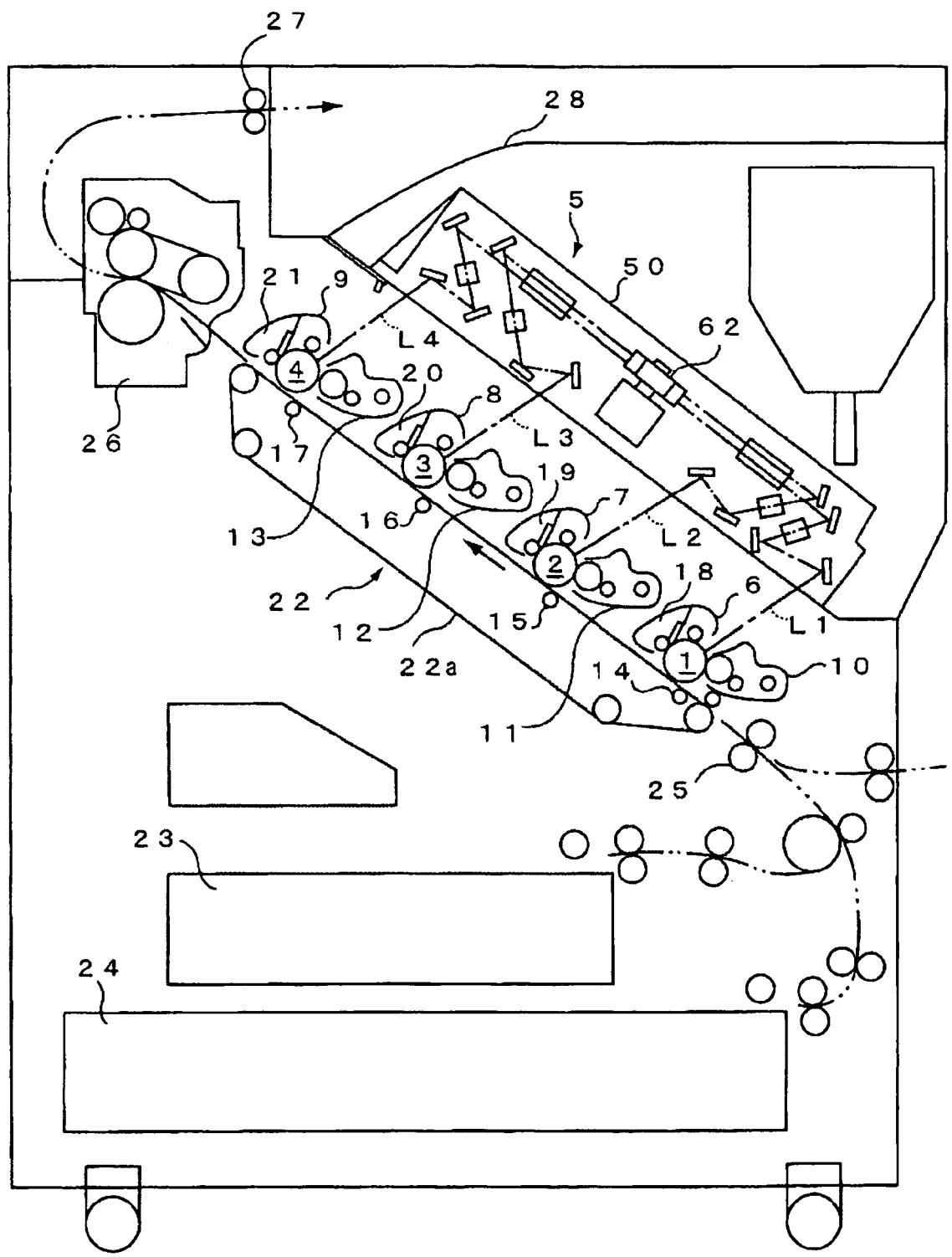
FIG. 2 is a schematic of an image forming apparatus.

The general structure and operations of an image forming apparatus according to the present embodiment will be explained with reference to FIG. 2. The image forming apparatus is a full-color image forming apparatus in which a plurality of optically-conductive photosensitive members in the form of drums (namely, photosensitive drums) 1, 2, 3, and 4 are disposed next to one another so as to serve as image holding members. These four photosensitive drums 1, 2, 3, and 4 form images corresponding to the colors of yellow (Y), magenta (M), cyan (C), and black (Bk), respectively, starting from the one on the right side of the page, for example. It should be noted that the order in which the colors are arranged is not limited to this example and can be arranged in any other way.

In order to perform an electronic photograph process, around the four photosensitive drums 1, 2, 3, and 4 are provided electric charging units 6, 7, 8, and 9 (including an electric charging roller, an electric charging brush, an electric charger), an optical scanning device 5 that irradiates light beams L1, L2, L3, and L4, developing units (developing devices for the colors of Y, M, C, and Bk, respectively) 10, 11, 12, and 13, a transferring and carrying unit 22 including a transferring and carrying belt 22a and transferring units (including a transferring roller, a transferring brush) 14, 15, 16, and 17 disposed on the back of the transferring and carrying belt 22a, and cleaning units (including a cleaning blade, a cleaning brush) 18, 19, 20, and 21. This arrangement enables the photosensitive drums 1, 2, 3, and 4 to form images in the respective colors.

Provided beneath the four photosensitive drums 1, 2, 3, and 4 that are disposed next to one another is the transferring and carrying belt 22a stretched over a driving roller and a plurality of subordinate rollers and is forwarded by the driving roller in the direction shown with the arrow in the drawing. Also, provided beneath the main unit of the image forming apparatus are a plurality of paper feeding units 23 and 24 that contain a transferring member like recording paper. The transferring member contained in the paper feeding units 23 and 24 is supplied to the transferring and carrying belt 22a via a paper feeding roller, a pair of carrying rollers, and a pair of resist rollers 25 and is held and carried by the transferring and carrying belt 22a.

Latent images formed on the photosensitive drums 1, 2, 3, and 4 by the optical scanning device 5 are developed into visible images with toners in the colors of Y, M, C, and Bk in the developing units 10, 11, 12, and 13. The toner images in the colors of Y, M, C, and Bk that have been made visible are sequentially transferred on top of one another onto the transferring member that is held on the transferring and carrying belt 22a by the transferring rollers 14, 15, 16, and 17 of the transferring and carrying unit 22.

The transferring member on which the images in the four colors have been transferred is conveyed to a fixing unit 26. After the images are fixed by the fixing unit 26, the transferring member is ejected onto an ejected paper tray 28 by a pair of paper ejecting rollers 27.

Figure 1:
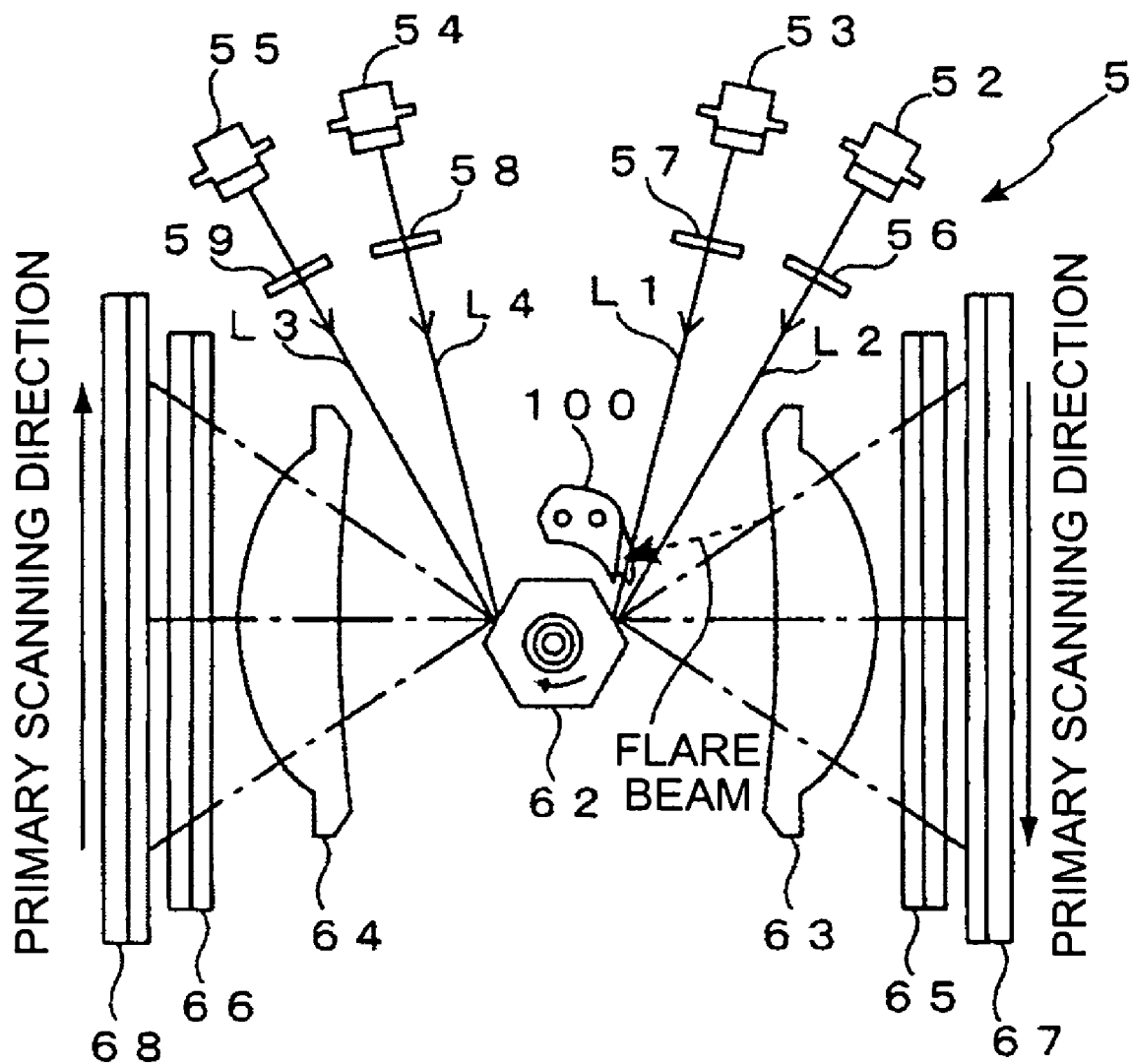
FIG. 1 is a plan view of an optical scanning device according to a first embodiment of the present invention.
Figure 3:
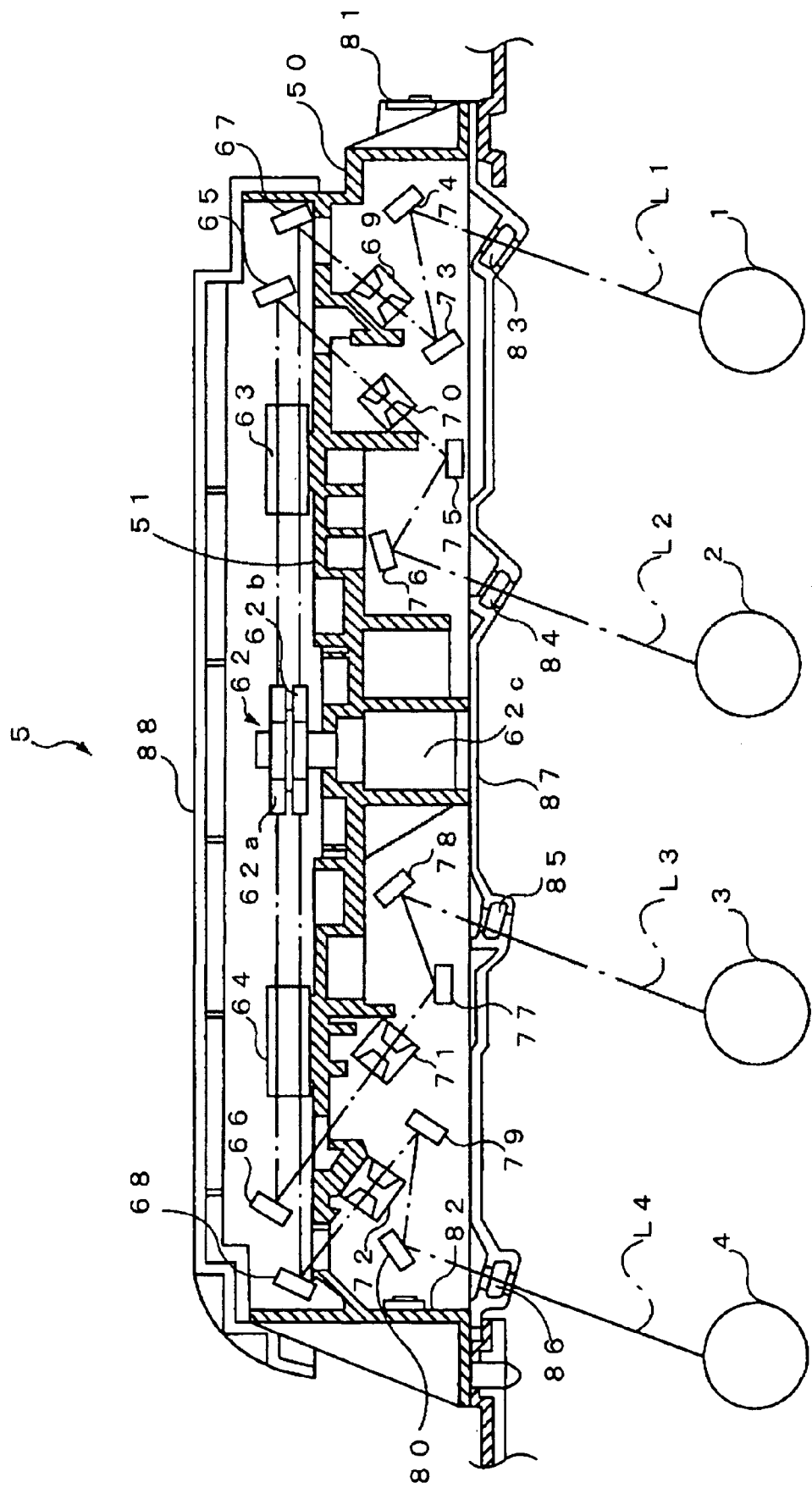
FIG. 3 is a cross-sectional view of the optical scanning device shown in FIG. 1.

As shown in FIGS. 1 and 3, the optical scanning device 5 includes: four light source units 52, 53, 54, and 55; an optical deflector 62 that separates the light beams L1, L2, L3, and L4 emitted from the light source units 52, 53, 54, and 55 as a light flux into two symmetrical directions and deflects and scans the light beams; and scanning and image forming optical systems (image forming lenses 63, 64, 69, 70, 71, and 72 and beam path refracting mirrors 65, 66, 67, 68, 73, 74, 75, 76, 78, 79, and 80) that are disposed symmetrically in the two directions on either side of the optical deflector 62 and bring the light beams L1, L2, L3, and L4 that have been deflected and scanned by the optical deflector 62 to the surfaces to be scanned of the corresponding photosensitive drums 1, 2, 3, and 4. These constituent members are housed in a single optical housing unit 50.

More specifically, the four light source units 52, 53, 54, and 55 are provided on the side walls of the optical housing unit 50. The optical deflector 62 is disposed substantially at the center of a base board 51 of the optical housing unit 50. The scanning and image forming optical systems are disposed both on the upper surface side and the lower surface side of the base board 51.

In addition, covers 87 and 88 are provided at the top and the bottom of the optical housing unit 50. The cover 87 at the bottom has openings through which light beams are to pass, and sheets of dust-proof glass 83, 84, 85, and 86 are provided over the openings.

The optical scanning device 5 converts color-decomposed image data that is inputted from a document reading apparatus (a scanner), an image data output apparatus (a personal computer or a receiving unit of a facsimile), or the like, which is not shown in the drawings, into signals used for driving light sources. The optical scanning device 5 drives semiconductor lasers (LDs) that are the light sources inside the light source units 52, 53, 54, and 55 according to the converted signals so that light beams are emitted.

The light beams L1, L2, L3, and L4 emitted from the light source units 52, 53, 54, and 55 reach the optical deflector 62 having six deflection faces via cylindrical lenses 56, 57, 58, and 59 that are used for correcting optical face tangle errors and are then deflected and scanned into two symmetrical directions by two stages of polygon mirrors 62a and 62b that are rotated at the same speed by a polygon motor 62c.

In the description above, although the polygon mirrors 62a and 62b represent a structure with two stages being an upper stage and a lower stage, namely a stage for the light beams L2 and L3 and the other stage for the light beams L1 and L4, it is also acceptable to have an arrangement in which a single thicker polygon mirror deflects and scans the four light beams.

The light beams L1, L2, L3, and L4 that have been deflected and scanned into two directions by the polygon mirrors 62a and 62b in the optical deflector 62 pass first image forming lenses 63 and 64 that are made up of, for example, two layers of fθ lenses (an upper layer and a lower layer). The light beams L1, L2, L3, and L4 are then refracted by first refracting mirrors 65, 66, 67, and 68 so as to pass through the openings provided in the base board 51. The light beams L1, L2, L3, and L4 then pass second image forming lenses 69, 70, 71, and 72 that are, for example, longitudinal toroidal lenses, and are irradiated onto the surfaces of the photosensitive drums 1, 2, 3, and 4 for the corresponding colors via second refracting mirrors 73, 75, 77, 79, third refracting mirrors 74, 76, 78, 80, and the dust-proof glass 83, 84, 85, and 86 so that static latent images are written onto the photosensitive drums 1, 2, 3, and 4.

The four light source units 52, 53, 54, and 55 include semiconductor lasers (LDs) that serve as light sources and collimate lenses that collimate light fluxes emitted from the semiconductor lasers. Each of the light source units 52, 53, 54, and 55 has a structure in which a semiconductor laser and a collimate lens are incorporated into a holder. It is also possible to provide a light source unit for black (e.g. the light source unit 54) that is heavily used when black and white images are formed with a multi-beam structure having two or more sets of a light source (LD) and a collimate lens, in order to enable high-speed writing.

When the multi-beam structure is used, by allowing the light source unit to be rotatable on the light axis with respect to the side walls of the optical housing unit 50, it is possible to adjust the beam pitch in the secondary scanning direction, and it is therefore possible to change the pixel density (for example, 600 dpi, 1200 dpi etc.) when black and white images are formed.

Synchronization detecting mirrors (not shown) are provided on the light beam paths of the light beams L1, L2, L3, and L4, for extracting light fluxes at the scanning start positions in the primary scanning directions. The light fluxes reflected by the synchronization detecting mirrors are received by synchronization detectors 81 and 82, and synchronization signals to start the scanning process are outputted.

The scanning directions of the light beams L1, L2, L3, and L4 that are deflected and scanned by the optical deflector 62 are referred to as the primary scanning direction and coincide with the axial directions of the photosensitive drums 1, 2, 3 and 4. The direction that orthogonally intersects the primary scanning direction is the secondary scanning direction, which coincides with the rotation directions of the photosensitive drums 1, 2, 3, and 4 (i.e. the directions in which the surfaces of the photosensitive drums move) and also with the forwarding direction of the transferring and carrying belt 22a, which is to be described later. In other words, the width direction of the transferring and carrying belt 22a is the primary scanning direction, and the forwarding direction of the transferring and carrying belt 22a is the secondary scanning direction.

As shown in FIG. 1, a flare beam shielding member 100 is disposed close to the optical deflector 62, in order to prevent flare beams reflected by one of the scanning and image forming optical systems from entering another scanning image forming optical system. Although only one flare beam shielding member 100 is shown in FIG. 1, it is possible to have more than one flare beam shielding member as necessary, according to different conditions (the characteristics related to generation of flare beams) such as how the positions of the light sources are arranged.

Figure 4:
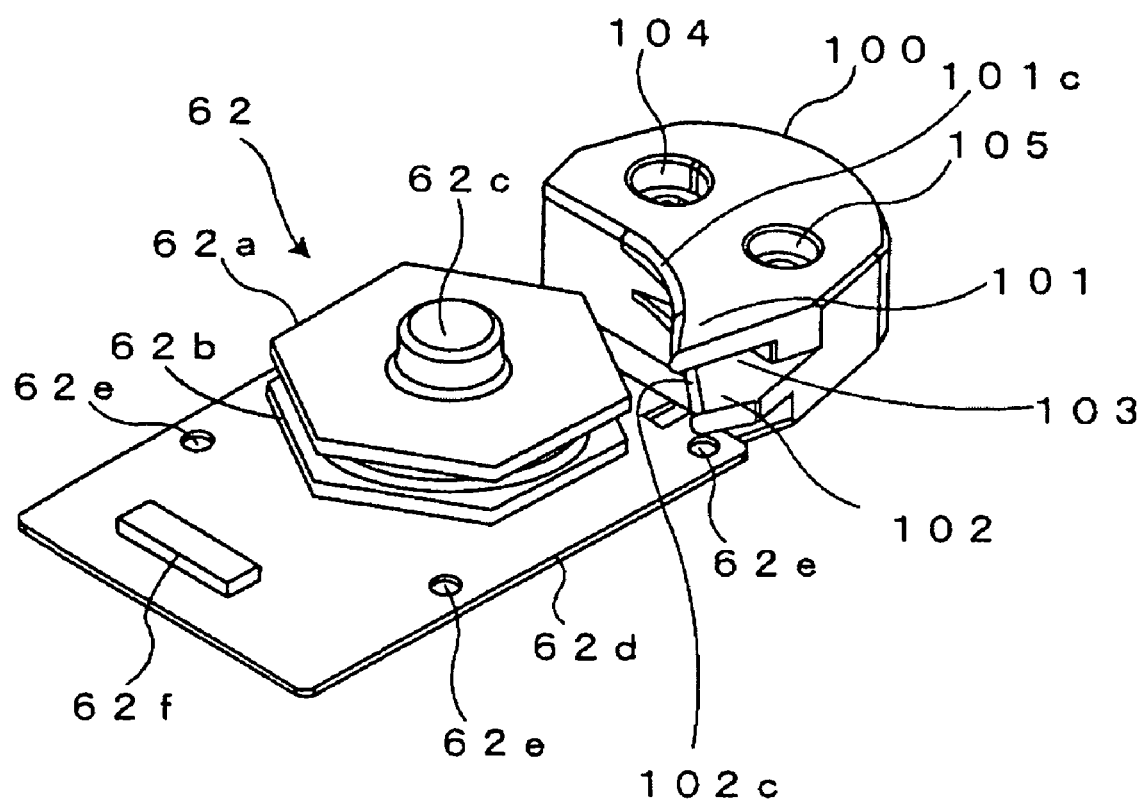
FIG. 4 is a perspective view of an optical deflector and a flare beam shielding member in the optical scanning device shown in FIG. 1.

As shown in FIG. 4, the optical deflector (a polygon scanner) 62 includes the polygon mirrors 62a and 62b, the polygon motor 62c for driving the polygon mirrors 62a and 62b, and a control substrate 62d that supports the polygon motor 62c. The control substrate 62d has a screw insertion hole 62e to be used to fix the optical deflector 62 onto the optical housing unit 50 and also has a driver IC 62f mounted thereon. In the following description, the polygon mirrors 62a and 62b might be collectively referred to as "a polygon mirror".

The flare beam shielding member 100 is divided into two stages that are arranged on top of each other (i.e. in the secondary scanning direction). The two stages are namely an upper shielding unit 101 that corresponds to the polygon mirror 62a and a lower shielding unit 102 that corresponds to the polygon mirror 62b. There is a space 103 between the upper shielding unit 101 and the lower shielding unit 102.

The flare beam shielding member 100 also has screw insertion holes 104 and 105 each of which is a through hole extending in the up and down direction. The flare beam shielding member 100 is to be fixed onto the optical housing unit 50 with screws (or bolts), which are not shown in the drawings, using the screw insertion holes 104 and 105.

As described above, the laser beams L1 and L2 incident to the polygon mirrors 62a and 62b are deflected and scanned by the polygon mirrors 62a and 62b and reach the image forming lenses (i.e. the scanning and image forming optical systems). When the laser beams that are reflected on the incident surface (i.e. the flare beams) pass the vicinity of the polygon mirrors and become incident to the other scanning and image forming optical system on the opposite side, defects are caused in the images.

For the purpose of shielding such flare beams, the flare beam shielding member 100 is provided.

Figure 5:
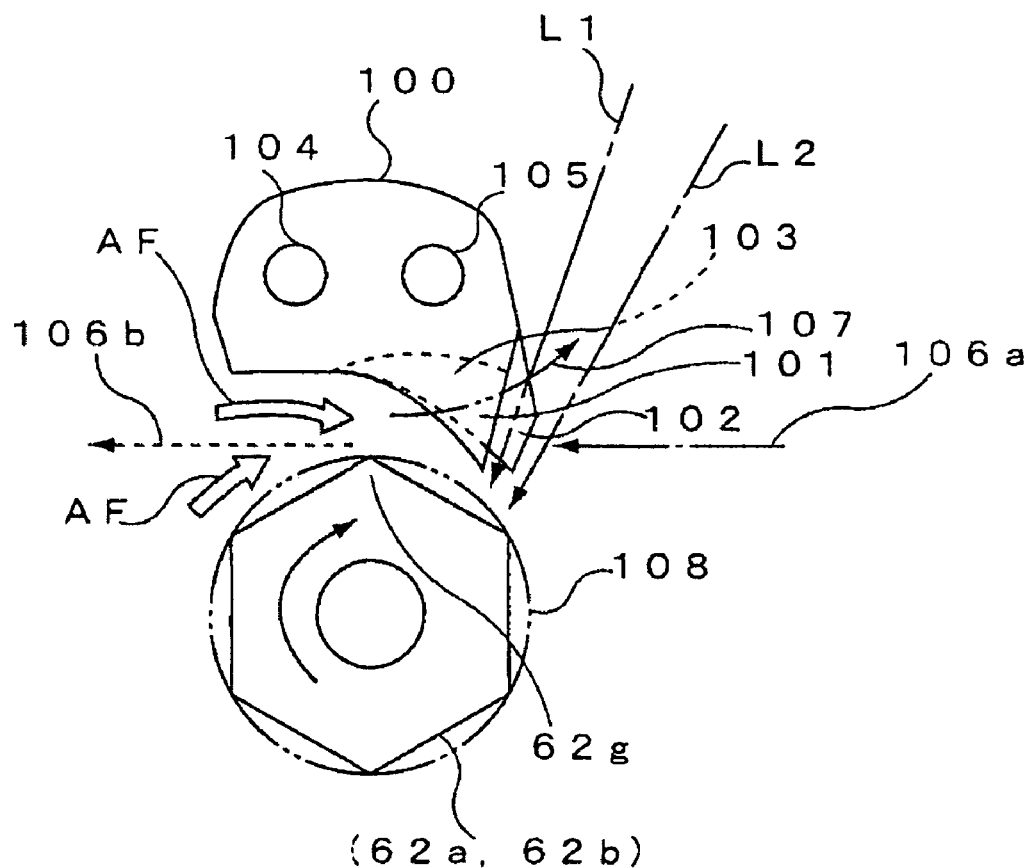
FIG. 5 depicts a shielding function of the flare beam shielding member.
Figure 6:
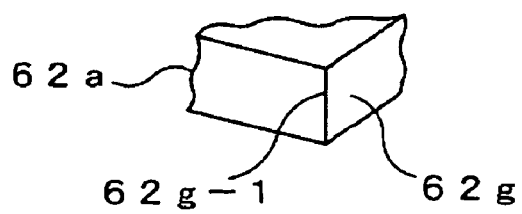
FIG. 6 is a perspective view of an edge line portion of a polygon mirror shown in FIG. 1.

As shown in FIG. 5, the flare beam shielding member 100 is structured to have an arrangement wherein an edge line portion in the secondary scanning direction to which an edge line portion (hereinafter may be referred to as a polygon edge portion) 62g (the corner portion that includes an edge line 62g-1 to connect the upper apex and the lower apex shown in FIG. 6; the same applies for the polygon mirror 62b) in the secondary scanning direction (i.e. the rotation axial direction of the polygon mirror) at an apex portion of the polygon mirror comes closest in passing is placed to be out of alignment, substantially in the rotation direction within a plane that orthogonally intersects the rotation axial direction of the polygon mirror. In other words, an edge line of the polygon mirror in the rotation axial direction to which the edge line 62g-1 comes closest in passing is placed to be out of alignment, substantially in the rotation direction within a plane that orthogonally intersects the rotation axial direction of the polygon mirror.

Figure 7:
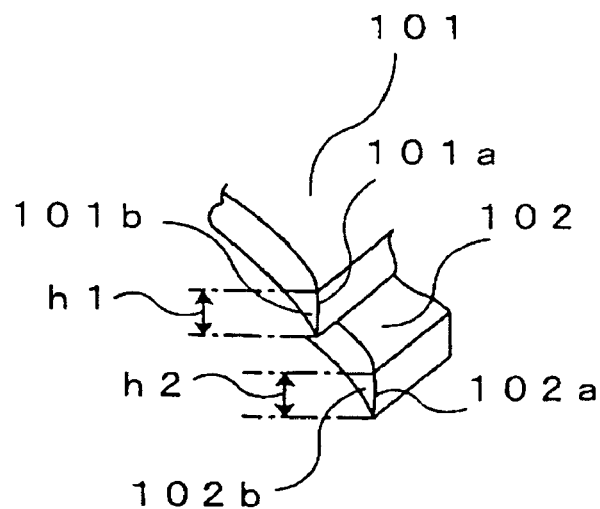
FIG. 7 depicts edge lines being out of alignment at an edge line portion of the flare beam shielding member.

More specifically, as shown in FIG. 7, an edge line portion (the corner portion that includes an edge line 101a to connect the upper apex and the lower apex) 101b of the upper shielding unit 101 is disposed to be out of alignment with an edge line portion (the corner portion-that includes an edge line 102a to connect the upper apex and the lower apex) 102b of the lower shielding unit 102, substantially in the rotation direction within a plane that orthogonally intersects the rotation axial direction of the polygon mirror. The overall edge width (i.e. the width of the edge line) of the flare beam shielding member 100 in the secondary scanning direction that is positioned close to the polygon edge portion is divided into h1 and h2.

As shown in FIG. 5, a flare beam 106a is shielded by the upper shielding unit 101 and the lower shielding unit 102 and is prevented from entering the scanning and image forming optical system on the opposite side (106b).

The "direction in which the edge line portions are placed to be out of alignment within a plane that orthogonally intersects the rotation axial direction of a polygon mirror" may be appropriately determined within a certain range in which the flare beam can be shielded.

Due to the rotation of the polygon mirror in the clockwise direction, the air in the surrounding is drawn along so as to cause an air flow AF and is compressed toward the downstream side of the flare beam shielding member 100 (the downstream side of the rotation direction of the polygon mirror). The air flow is compressed the most at a position where the flare beam shielding member 100 is closest to the polygon mirror and is cut off by a relative passage between the polygon edge portion 62g and the edge line portion (or the edge portion) on the flare beam shielding member 100 side.

Subsequently, the compressed air is released and expands rapidly. According to a conventional technique, the edge lines at an edge portion of the flare beam shielding member 100 are linearly aligned in the secondary scanning direction so that a relative passage is made for the edge-line 62g-1 of the polygon edge portion 62g with the whole area in the secondary scanning direction (i.e. the whole width in the up and down direction).

In other words, the corner portions of the flare beam shielding member 100 are aligned at the same position for the whole area of the polygon edge portion in the secondary scanning direction. With this conventional arrangement, the air is compressed and then expands rapidly when the polygon edge portion is passing and, in some cases, noises, abnormal sound, vibrations, and a temperature increase are caused, and an adverse influence is caused to the deflection stability of the polygon mirrors.

According to the present embodiment, the upper shielding unit 101 and the lower shielding unit 102 are placed so as to be out of alignment with each other, substantially in the rotation direction within a plane that intersects the rotation axial direction of the polygon mirror, so that the edge line of the polygon edge portion and the edge line of the edge portion of the flare beam shielding member 100 do not pass each other at the same timing for the whole area in the secondary scanning direction. In other words, the edge line portion 101b is placed so as to be out of alignment with the edge line portion 102b, substantially in the rotation direction within a plane that orthogonally intersects the rotation axial direction of the polygon mirror.

With this arrangement, with the rotation of the polygon mirror, the air is compressed and then expands gradually between the polygon edge portion and the edge portion of the flare beam shielding member 100, and thus the level of rapidness in the compression and expansion of the air is lowered.

The upper side of the edge line portion 102b of the lower shielding unit 102 serves as a light beam path for the light beam L1 and also serves as a space in which the air expands that has been compressed between the edge portion of the polygon mirror 62a and the edge line portion 101b of the upper shielding unit 101.

In the present embodiment, because the space 103 is provided between the upper shielding unit 101 and the lower shielding unit 102, the arrangement allows the size of an area to be smaller in which the polygon edge portion comes closest to the flare beam shielding member 100 when passing by the flare beam shielding member 100.

Furthermore, part of the air flow AF between the polygon mirror and the flare beam shielding member 100 goes into the space 103 before being compressed in a close portion, which is an area where the elements are positioned close to each other, and escapes to the outside, as shown with the arrow 107 in FIG. 5. This arrangement further allows the level of compression to be lowered at the close portion, which is the area where the elements are positioned close to each other.

As shown in FIG. 4, according to the present embodiment, the inside walls 101c and 102c of the upper shielding unit 101 and the lower shielding unit 102 facing the polygon mirror are each arranged to have a smooth curved shape or a chamfered shape. Thus, the compressed air is able to smoothly escape either into the space 103 or in the up and down direction.

Accordingly, with this arrangement, it is possible to reduce the air resistance in the polygon mirror rotation surrounding area and to regulate the flow of the air. It is therefore possible to reduce side effects resulting from installation of the flare beam shielding member 100. From this aspect also, it is possible to further allow the level of compression to be lowered at a close portion, which is the area where the elements are positioned close to each other.

Figure 8:
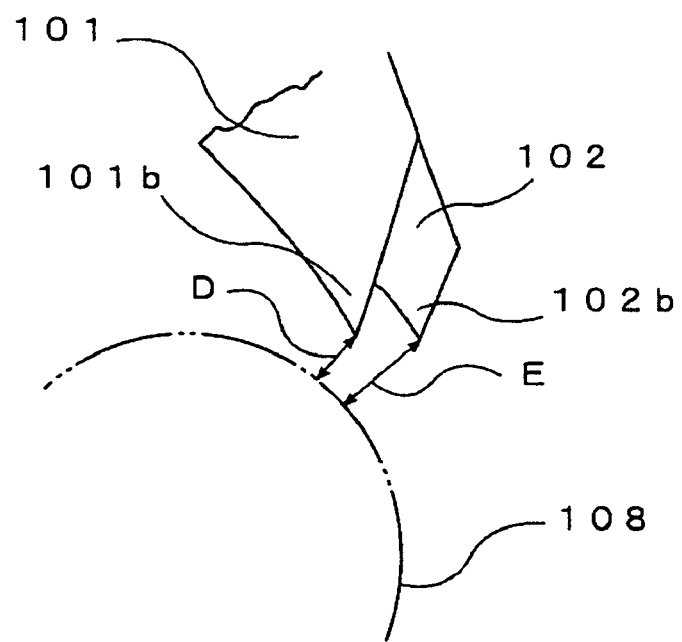
FIG. 8 depicts distances between edge line portions of the flare beam shielding member and a rotation circumference of the polygon mirror.

As shown in FIG. 8, the distance D between the edge line portion 101b and the polygon mirror rotation circumference 108 is arrange to be different from the distance E between the edge line portion 102b and the polygon mirror rotation circumference 108 (D<E).

It is acceptable as long as the corner of the edge line portion 101b (the position of the edge line 101a) and the corner of the edge line portion 102b (the position of the edge line 102a) are positioned to ensure the shielding function, i.e. to ensure that flare beams are shielded. Because these positions may be varied according to the positions of the light source unit 52 and 53, the positions may be optimized accordingly.

To be more specific, as long as the edge lines of the flare beam shielding member 100 are positioned so as to ensure the shielding function, they do not necessarily have to be close to the rotation area of the polygon mirror. When the positions are optimized as described above, it is possible to further minimize rapid compression and expansion of the air, and therefore possible to alleviate the side effects resulting from installation of the flare beam shielding member 100.

Figure 9:
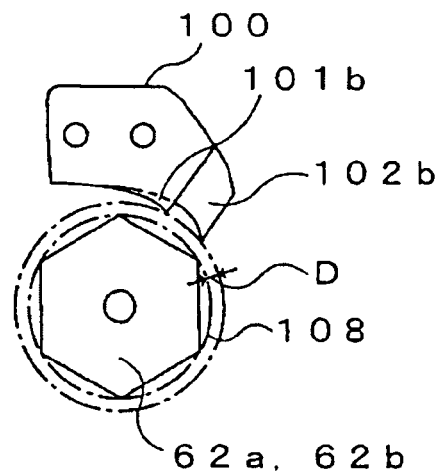
FIG. 9 depicts an example in which the distances between each of the edge line portions of the flare beam shielding member and the polygon mirror rotation circumference are equal.

In other words, in order to reduce the side effects such as noises, it is desirable to keep the edge lines of the flare beam shielding member 100 as far away as possible from the polygon mirror. Needless to say, as shown in FIG. 9, by having an arrangement wherein the distance between the polygon mirror rotation circumference 108 and the corner of the edge line portion 101b is equal to the distance between the polygon mirror rotation circumference 108 and the corner of the edge line portion 102b (i.e. both of the distances being D), it is possible to reduce the side effects such as noises, compared to a conventional arrangement wherein "the whole width of the edge line is passed".

The flare beam shielding member 100 may be integrally formed with the optical housing unit 50; however, when the flare beam shielding member 100 is arranged to be a separate part from the optical housing unit 50 and is installed with a screw, double-faced tape, caulking, a board spring, or the like, it is possible to optimize the form and shape of the flare beam shielding member 100 without restraint related to processing or mold structures, such as undercuts.

Especially, when the flare beam shielding member 100 has two stages as in the present embodiment, if it is molded in the up and down direction, there will be a large undercut portion, and thus it is difficult to obtain a desired shape for reducing the side effects resulting from installation of the flare beam shielding member 100. In many cases, arranging the flare beam shielding member 100 to be a separate part from the optical housing unit 50 makes it easy to manufacture the parts and to have an advantage in terms of optimization of the shapes of the parts.

Further, arranging the flare beam shielding member 100 to be a separate part from the optical housing unit 50 makes it possible to choose a different material for the flare beam shielding member 100 from a material used for the optical housing unit 50. Even if the flare beam shielding member 100 is vibrated and have sympathetic vibrations due to a vibration mode that is determined by the rotation speed of the optical deflector 62, the number of the faces, the size, and the exterior shape of the polygon mirror, and the position of the flare beam shielding member 100, it is possible to largely change the unique vibration number if it is possible to choose the material of which the flare beam shielding member 100 is made. It is therefore possible to avoid the sympathetic vibrations due to the vibration mode affected by the systems mentioned above.

Generally speaking, by choosing a material that has better performance of reducing vibrations for the flare beam shielding member 100 than the material of which the optical housing unit 50 is made, it is possible to avoid abnormal vibrations, noises, and abnormal sound.

The position of the optical deflector 62 is determined with respect to the optical housing unit 50 with a high precision level. One of the designing methods that is often used is to fit the outside diameter of the lower shaft bearing of the optical deflector 62 into a hole provided in the optical housing unit 50.

By using the lower shaft bearing of the optical deflector 62 as a position determining portion to be used in the installation process of the flare beam shielding member 100 onto the optical housing unit 50, it is possible to maintain the relationship with the polygon mirror and the relationship with other optical elements with high precision levels.

An arrangement to be used to mount elements onto the optical housing unit 50 according to the present embodiment will be described with reference to FIGS. 10 and 11.

A base 109 that is to be used for determination of the position and extends from the lower surface of the flare beam shielding member 100 is fit to the lower shaft bearing 62h of the optical deflector 62 with a high precision level. Further, the lower shaft bearing 62h of the optical deflector 62 is fit to a hole 51a provided in the base board 51 of the optical housing unit 50 with a high precision level. The control substrate 62d is fastened onto the base board 51 with a screw 110 via the screw insertion hole 62e.

Normally, because the position of the optical deflector 62 is determined with respect to other optical elements with high precision levels, the flare beam shielding member 100 is consequently positioned with a high precision level with respect to flare beams being caused. Thus, it is possible to shield flare beams efficiently. Also, because the position of the optical deflector 62 is determined with respect to the polygon mirror with a high precision level, it is possible to maintain the space between the optical deflector 62 and the edge portion of the polygon mirror with a high precision level. Thus, it is possible to inhibit fluctuation found in the side effects resulting from installation of the flare beam shielding member 100.

When the position of the optical deflector 62 is determined by an element other than the lower shaft bearing 62h (for example, a fastening screw portion), it is possible to achieve the same object and effects as described above by having an arrangement wherein this element is used in common among different parts to determine the positions of these parts.

Figure 11:
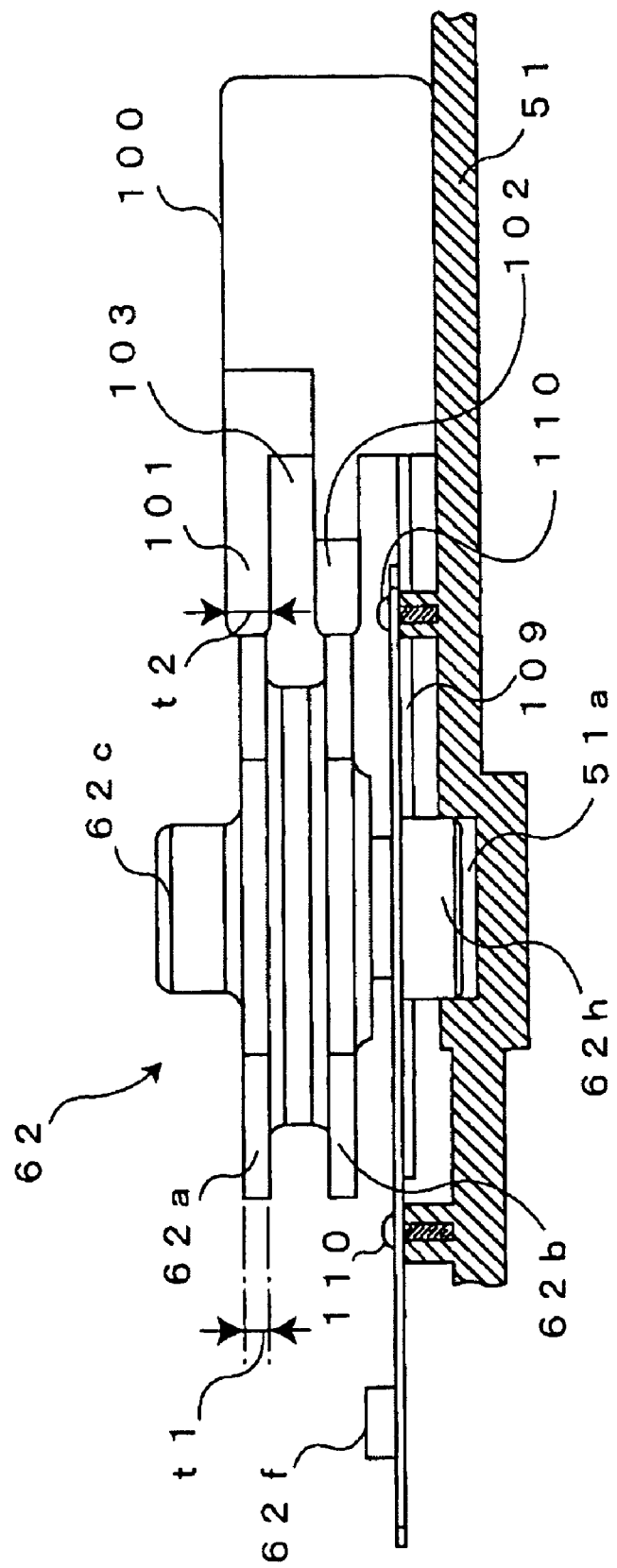
FIG. 11 is a side view of the arrangement in FIG. 10.

As shown in FIG. 11, the width t2 (h1 shown in FIG. 7) of the edge line portion 101b of the flare beam shielding member 100 in the secondary scanning direction is arranged to be longer than the length t1 of the reflection face of the polygon mirror 62a in the secondary scanning direction. The same applies to the relation between the edge line portion 102b and the polygon mirror 62b.

With these arrangements, when the errors in preciseness of positioning the optical elements and scattering of flare beams as being reflected on the surface of the image forming lenses are considered, it is possible to shield the flare beams without failure.

By arranging the flare beam shielding member 100 to have a structure that has divided portions in the secondary scanning direction and in which the positions of the corners are placed so as to be out of alignment with each other in the rotation direction of the polygon mirror, it is possible to stagger the timing at which the polygon edge portion passes each of the corners. It is therefore possible to reduce the side effects such as noises, abnormal sound, vibrations, and a temperature rise, as described above.

Figure 12:
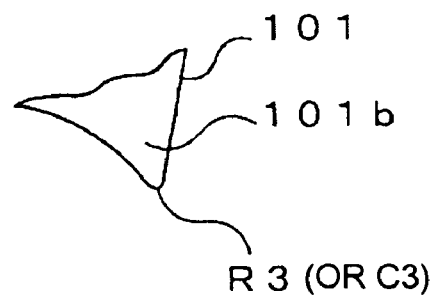
FIG. 12 depicts a shape of a corner of the edge line portion of the flare beam shielding member in a primary scanning cross section.

In order to further reduce the side effects, it is also acceptable to arrange the shape of the corner of the edge line portion 101b of the flare beam shielding member 100 in a primary scanning cross section (a plane that orthogonally intersects the rotation axial direction of the deflector) to be curved or chamfered, as shown in FIG. 12. When the corner is arranged to have a curved shape, the curve may be an arc of a circle having a radius of 3 millimeters (R3), for example. When the corner is arranged to have a chamfered shape, the chamfered portion may be a cut having sides of 3 millimeter (C3), for example. The same applies to the edge line portion 102b.

By arranging the shapes of the portions of the flare beam shielding member 100 that come closest to the polygon mirror as above, it is possible to make the size of the area that comes close to the polygon mirror smaller, it is possible to minimize the side effects resulting from installation of the flare beam shielding member 100.

In addition, according to the present embodiment, as shown in FIG. 11, the shapes of the edge line portions 101b and 102b in the secondary scanning cross section (i.e. the shapes in cross sections in the rotation axial direction of the polygon mirror) are arranged to be curved (R-shaped). In the present example, the curved shapes at the corners of the edge line portions 101b and 102b are both arranged to be R10 (i.e. arcs of a circle having a radius of 10 millimeters).

Figure 13:
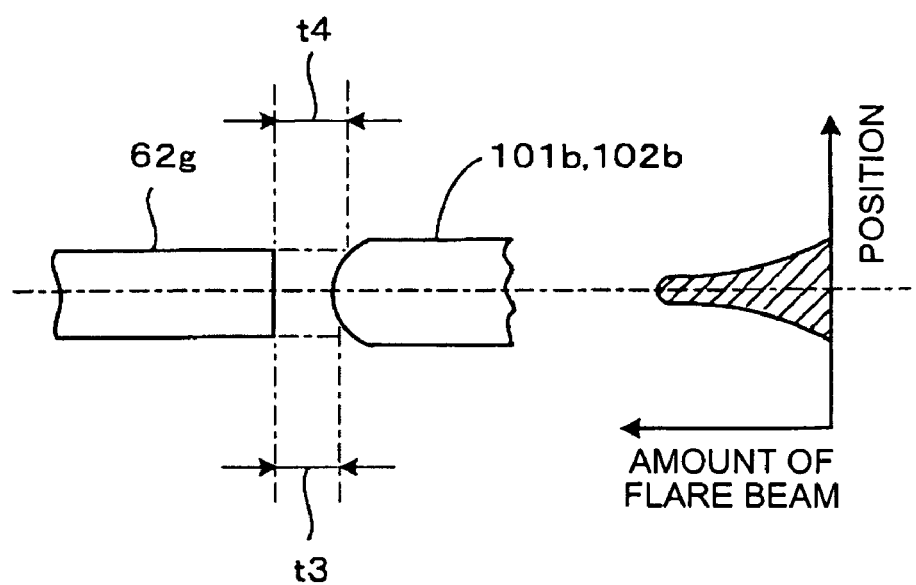
FIG. 13 depicts a shape of a corner of the edge line portion of the flare beam shielding member in a secondary scanning cross section.

FIG. 13 depicts the polygon edge portion 62g being closest to the corners (the edge line portions 101b and 102b) of the flare beam shielding member 100.

As shown in the drawing, by arranging the corners that come close to the polygon edge portion of the flare beam shielding member 100 to be R-shaped in the secondary scanning cross section, it is possible to achieve the maximum flare shielding effect.

In other words, with regard to the amount of light distribution from flare beams, the central portion where the amount of light is the largest is the position at which the corners come closest to the polygon mirror (the clearance is t3).

On the other hand, at other locations being away from the central portion where the amount of light from the flare beams is smaller, by arranging the corners (the edge line portions 101b and 102b) of the flare beam shielding member 100 to be away from the polygon mirror (i.e. the clearance is t4), it is possible to minimize the side effects resulting from installation of the flare beam shielding member 100 while the flare beam shielding effect is maintained.

According to the present embodiment, a structure in which the polygon mirror is structured to have two stages has been explained; however, it is possible to achieve the advantageous features as explained above with a one-stage structure, as well.

Additionally, although the explanation has illustrated an application to a structure with the oppositional scanning method using a single optical deflector 62; however, it is acceptable to install the flare beam shielding member 100 into a structure that scans in opposite directions with two optical deflectors respectively.

Figure 14:
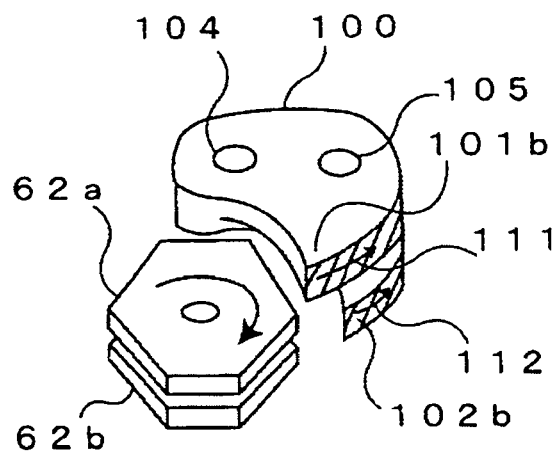
FIG. 14 is a perspective view of a flare beam shielding member according to a second embodiment.

FIG. 14 is a drawing for illustrating a second embodiment of the present invention. It should be noted that the same elements as in the first embodiment are marked with the same reference numbers. Explanation for the structures and the features that have already been described above will be omitted, as long as omission is appropriate, and only the main characteristics of the present embodiment will be explained (The same will apply to other embodiments that follow).

In the second embodiment, the flare beam shielding member 100 is different from the structure according to the first embodiment in that it does not have the space 103. Also, the edge line portions 101b and 102b are different from those in the first embodiment in that the downstream side of the edge line portions 101b and 102b (i.e. the external surfaces of the upper shielding unit 101 and the lower shielding unit 102 that are shown with hatching in the drawing), in terms of the polygon mirror rotation direction, are arranged to have curvature shapes in order to reduce the resistance from the air flow caused after the polygon edge portion has passed the edge line portions 101b and 102b.

After the polygon edge portion has passed, the compressed air is released and then expands rapidly. At that time, an air turbulence is expected to be caused due to separation of air flows. It is considered that such an air turbulence hits the external surfaces and increases the amount of noises.

More specifically, as for the noises (including abnormal sound) related to the rotation of the polygon mirror in a structure in which a flare beam shielding member is installed being close to the polygon mirror, it is natural to consider that the noises include some noise resulting from an air turbulence that is caused after the passing of the polygon edge portion.

According to the present embodiment, because the downstream side, in terms of the polygon mirror rotation direction, of each of the edge line portions 101b and 102b is arranged to have a curvature shape, the air during its expansion is smoothly guided as shown with arrows 111 and 112 (improvement in the aerodynamic characteristics). Consequently, it is possible to inhibit the turbulence due to the separation of air flows and to reduce the noises.

Figure 15:
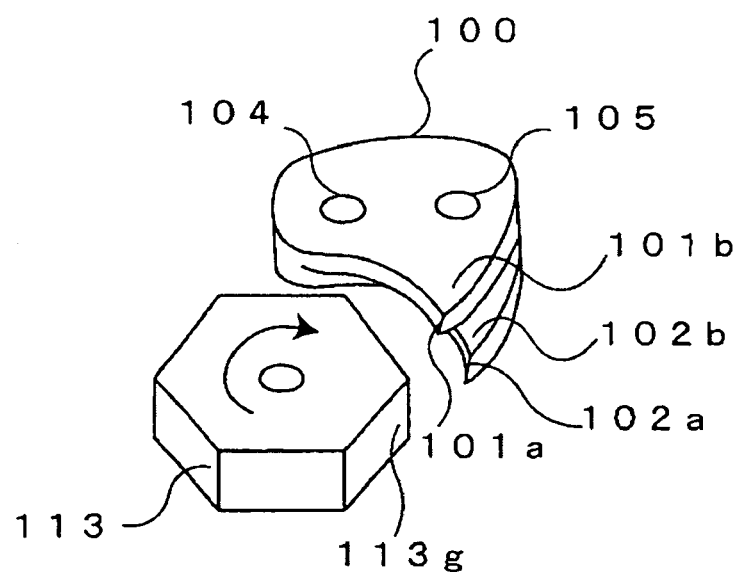
FIG. 15 is a perspective view of a flare beam shielding member according to a third embodiment.
Figure 16:
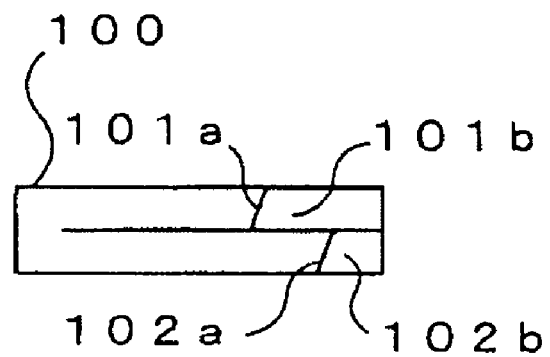
FIG. 16 is a side view of the flare beam shielding member shown in FIG. 15.

FIGS. 15 and 16 are drawings for illustrating a third embodiment of the present invention.

In the third embodiment, the characteristics lie in that the edge line portions 101b and 102b of the flare beam shielding member 100 that come closest to an edge portion 113g of a polygon mirror 113, which is made of one stage having a larger thickness in the secondary scanning direction, are arranged to be positioned at a torsional angle (including the concept of inclination) with respect to the edge portion 113g of the polygon mirror 113.

By having this arrangement, because the inside surfaces of the edge line portions 101b and 102b are inclined, the area compressed between the edge line portions 101b and 102b and the edge portion 113g of the polygon mirror 113 is reduced.

In addition, as shown in FIG. 16 (a view of the flare beam shielding member 100 seen from the direction of the polygon mirror 113), because the edge lines 101a and 102a are inclined substantially in the rotation direction of the polygon mirror 113, an edge line 113a of the edge portion 113g of the polygon mirror 113 does not pass at the same timing for the whole area of the edge lines 101a and 102a in the rotation axial direction of the polygon mirror 113.

With this arrangement, it is possible to avoid the situation where rapid compression and expansion of the air occur all at once when the edge portion 113g of the polygon mirror comes close to the flare beam shielding member 100. Thus, it is possible to alleviate the side effects resulting from installation of the flare beam shielding member 100.

Figure 17:
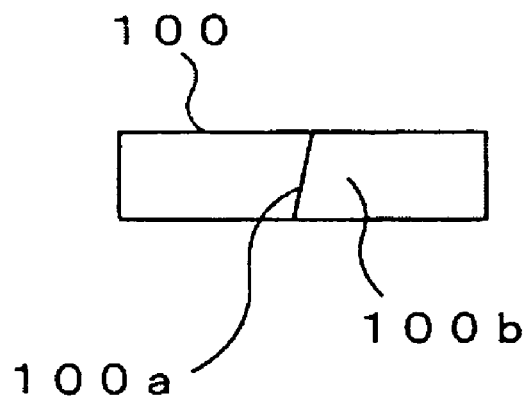
FIG. 17 is a side view of a flare beam shielding member according to a fourth embodiment.

FIG. 17 is a drawing for illustrating a fourth embodiment of the present invention.

According to the fourth embodiment, the characteristics lie in that the polygon edge portion and the edge line portion of the flare beam shielding member 100 in the secondary scanning direction are arranged so that they do not pass each other with a substantially constant distance there between for the whole area in the secondary scanning direction.

As shown in FIG. 17, the flare beam shielding member 100 is not divided into an upper portion and a lower portion, but rather has only an edge line portion 100b that includes an edge line 100a. The edge line 100a is inclined so that it is not parallel to the edge line of the edge portion 113g of the polygon mirror 113. Because the distance between the polygon edge portion and the edge line portion 100b changes in the secondary scanning direction (i.e. the distance gets larger toward the upper direction), it is possible to avoid the situation where rapid compression and expansion of the air occur all at once when the edge portion 113g of the polygon mirror 113 comes close to the flare beam shielding member 100.

According to the present embodiment, because the edge line portion 100b is arranged to be inclined toward right (the inclination direction may be opposite), the air smoothly flows toward the upper side of the flare beam shielding member 100 before being compressed in a closest portion, which is the area where the elements come closest to each other. Thus, it is possible to reduce the level of compression.

Figure 18:
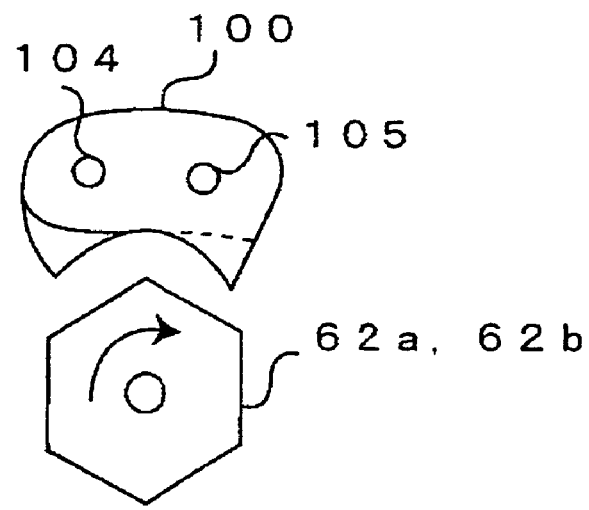
FIG. 18 is a top view of a flare beam shielding member according to a fifth embodiment.
Figure 19:
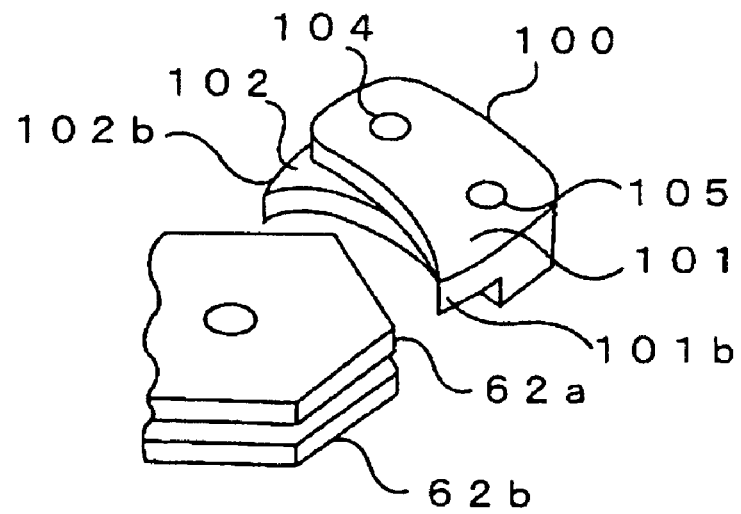
FIG. 19 is a perspective view of the flare beam shielding member shown in FIG. 18.

FIGS. 18 and 19 are drawings for illustrating a fifth embodiment of the present invention.

In the present embodiment, the divided portions, i.e. the upper portion and the lower portion, of the flare beam shielding member 100 are arranged to be positioned at a counter position and an anti-counter position respectively, with respect to the rotation direction of the polygon mirror.

The upper shielding unit 101 and the lower shielding unit 102 are arranged to be positioned at a counter position and an anti-counter position respectively, with respect to the rotation direction of the polygon mirror, with the polygon mirror being positioned at the center.

According to the present embodiment also, it is possible to avoid the situation where compression and expansion of the air occur all at once when the polygon edge portion comes close to the flare beam shielding member 100, for the same reasons as explained above. Thus, it is possible to alleviate the side effects resulting from installation of the flare beam shielding member 100.

Figure 20:
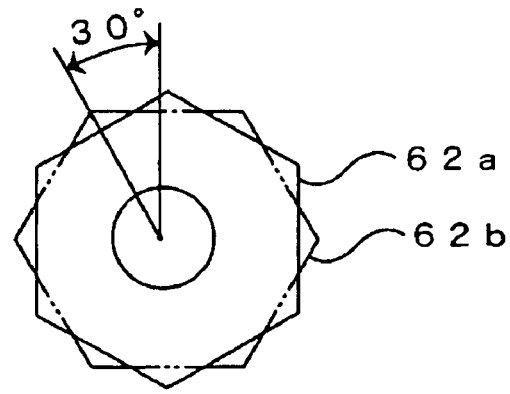
FIG. 20 is a plan view of a polygon mirror according to a sixth embodiment.

In each of the embodiments that have been described above, by changing the shape of the flare beam shielding member 100, the polygon edge portion and the edge portion of the flare beam shielding member 100 are arranged so that they do not pass each other with the whole widths in the secondary scanning direction or arranged so that they do not pass each other with a substantially constant distance there between for the whole area in the secondary scanning direction. It is, however, also acceptable to have another arrangement wherein, with an example in which the polygon mirror is arranged to have a plurality of stages, the phases of the mirror faces are placed so as to be out of alignment in the rotation direction of the polygon mirror, as shown in FIG. 20, so that the timing at which the edge portions of the polygon mirror pass the corner (i.e. the edge portion) of the flare beam shielding member 100 is largely staggered (a sixth embodiment of the present invention).

In the present example, as for the polygon mirror having two stages, the phase of the upper stage (the polygon mirror 62a) is out of alignment with the phase of the lower stage (the polygon mirror 62b) by 30 degrees in the rotation direction.

As for the flare beam shielding member, it is acceptable to have an arrangement wherein the edge portion passes the polygon edge portion with the whole widths in the secondary scanning direction, like in an arrangement according to a conventional technique.

According to the present embodiment also, it is possible to reduce the side effects resulting from installation of the flare beam shielding member.

Figure 21:
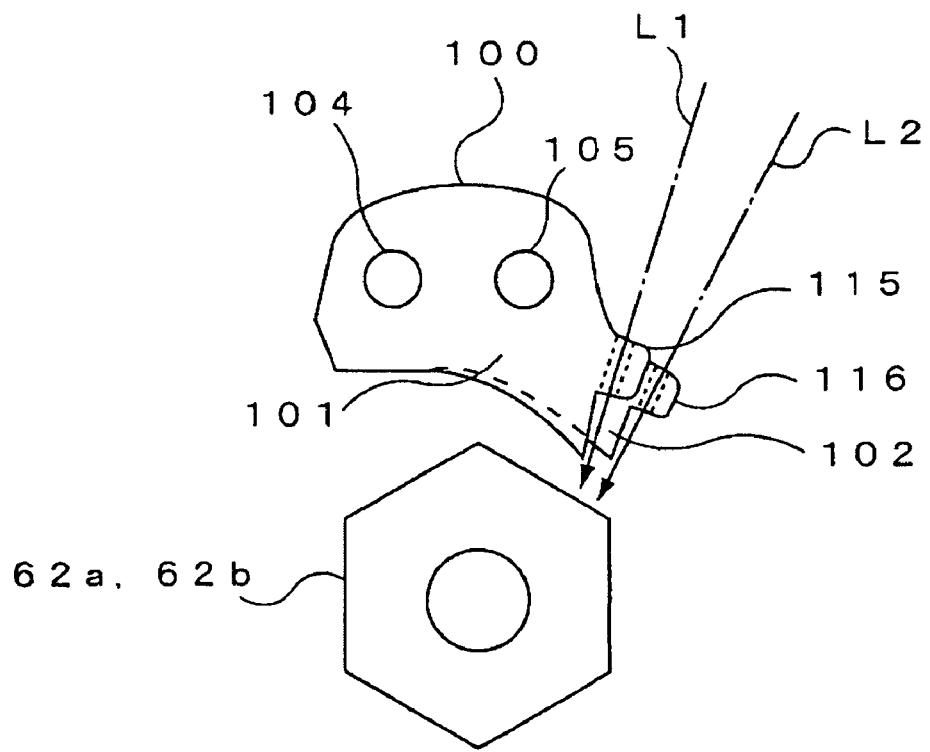
FIG. 21 is a plan view of a flare beam shielding member according to a seventh embodiment.
Figure 22:
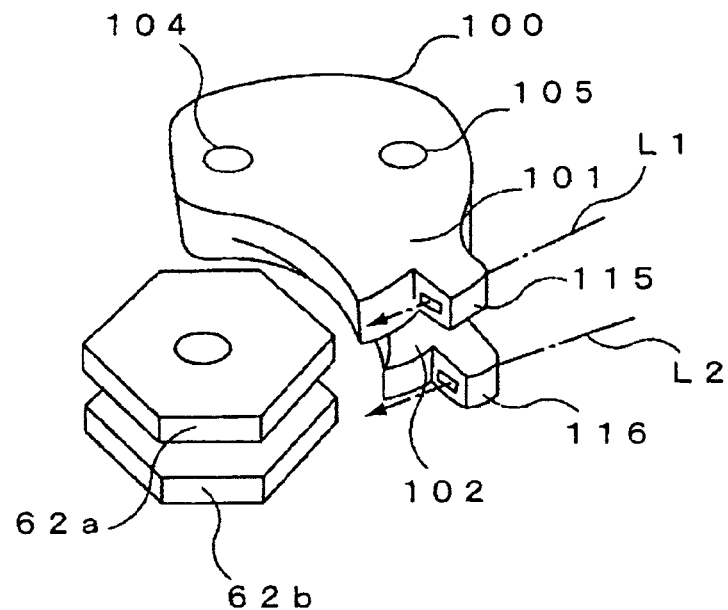
FIG. 22 is a perspective view of the flare beam shielding member shown in FIG. 21.

FIGS. 21 and 22 are drawings for showing a seventh embodiment of the present invention.

In the present embodiment, the characteristics lie in that the flare beam shielding member 100 has a function of adjusting the shape of a light flux emitted from a light source.

The upper shielding unit 101 of the flare beam shielding member 100 is integrally formed with an aperture 115 that is for adjusting the shape of the light beam L1. The lower shielding unit 102 is integrally formed with an aperture 116 that is for adjusting the shape of the light beam L2.

It is necessary that the flare beam shielding member 100 is positioned properly, with a high precision level, with respect to other optical elements such as the polygon mirror, the image forming lens, and the like. When the flare beam shielding member 100 is integrally formed with the apertures 115 and 116, it is possible to position the apertures 115 and 116 properly, with a high precision level.

Because the level of precision in positioning of the apertures has a large influence on the functions of the optical systems, it is possible, with this arrangement, to have higher efficiency in terms of the design and to reduce the number of the parts being used, compared to an arrangement in which the apertures are positioned at separate locations independently.

Figure 23:
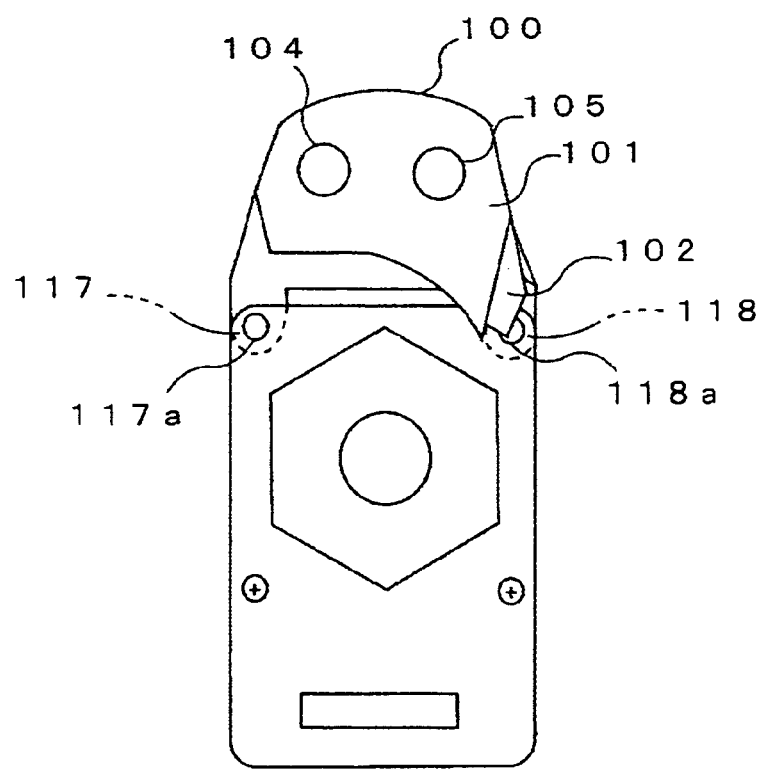
FIG. 23 is a plan view of an arrangement for determining positions of an optical deflector and a flare beam shielding member according to an eighth embodiment.
Figure 24:
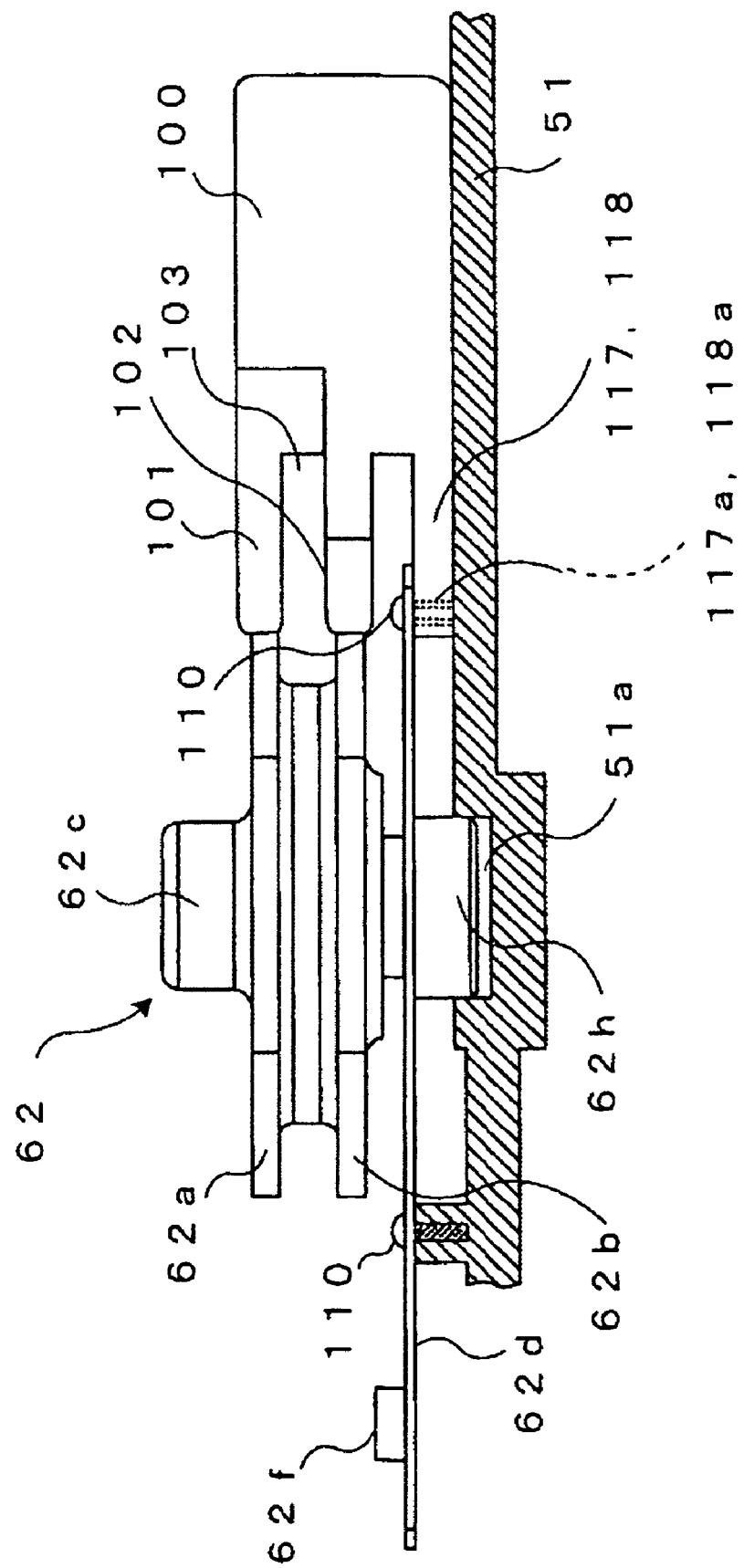
FIG. 24 is a side view of the arrangement shown in FIG. 23.

FIGS. 23 and 24 are drawings for showing an eighth embodiment of the present invention.

In the eighth embodiment, the characteristics lie in that the flare beam shielding member 100 has a function of installing the optical deflector 62. On the both ends of the lower part of the flare beam shielding member 100, installation pieces 117 and 118 are integrally formed to extend toward the bottom side of the control substrate 62d. The installation pieces 117 and 118 have screw holes 117a and 118a respectively that oppose the screw insertion hole 62e provided in the control substrate 62d.

The control substrate 62d is fixed onto the installation pieces 117 and 118 with the screw 110 on one end thereof positioned on the flare beam shielding member 100 side and is fixed onto the base board 51 of the optical housing unit 50 with the screw 110 on the other end thereof.

With this arrangement of installation, it is not possible to install the optical deflector 62 until the flare beam shielding member 100 is installed with the optical housing unit 50. It is therefore possible to prevent the situation, without fail and before a problem arises, where the optical deflector 62 is installed without the flare beam shielding member 100 by mistake either in the manufacturing process or while the product is on the market, which may result in defects in the images due to flare beams being caused.

Figure 25:
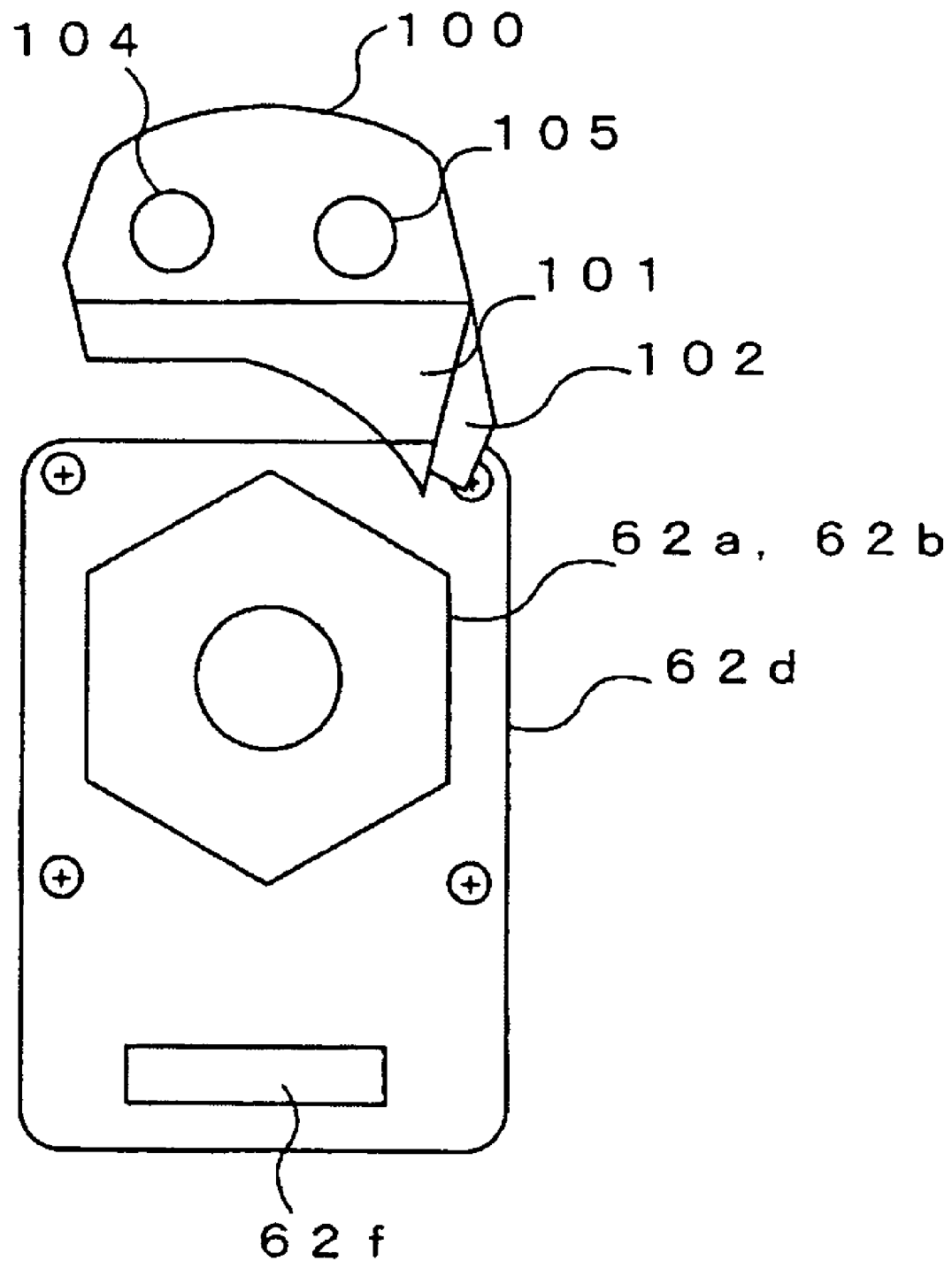
FIG. 25 is a plan view of an arrangement for installing an optical deflector and a flare beam shielding member according to a ninth embodiment.
Figure 26:
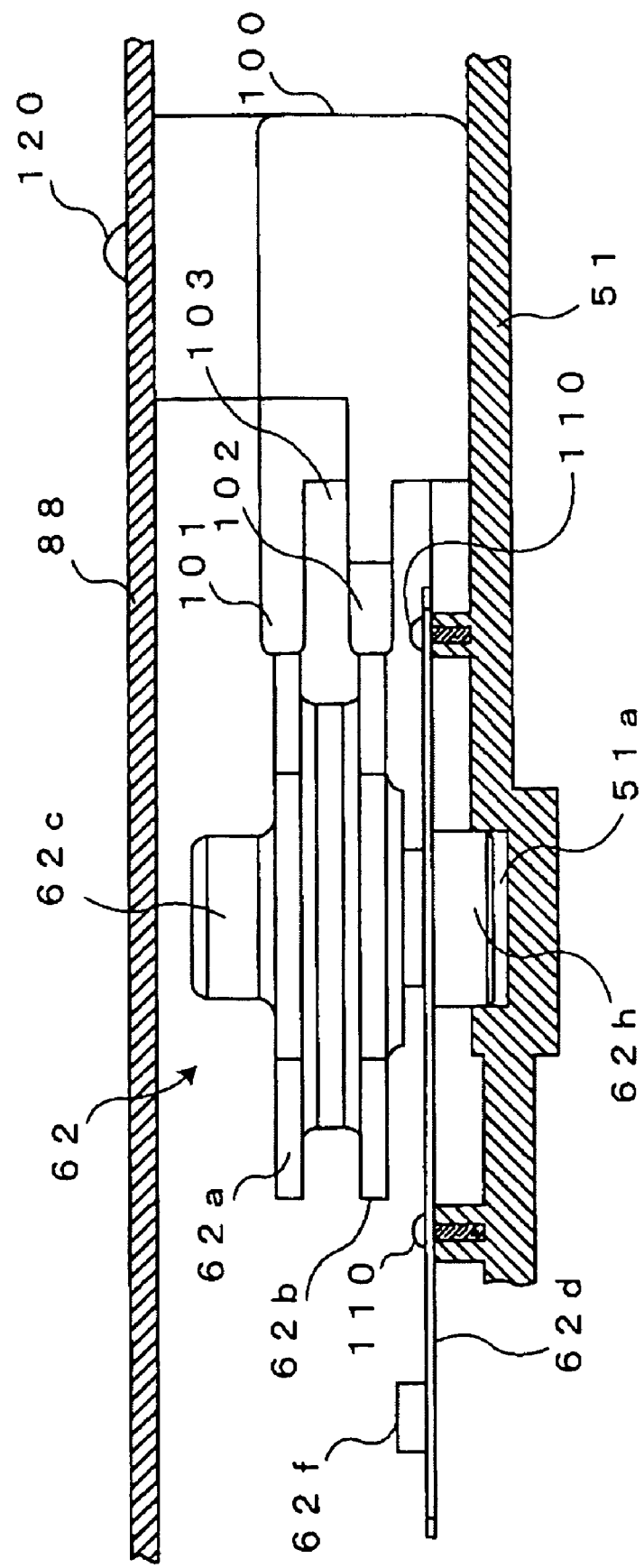
FIG. 26 is a side view of the arrangement shown in FIG. 25.

FIGS. 25 and 26 are drawings for illustrating a ninth embodiment of the present invention.

Because of how the flare beam shielding member 100 is positioned, the fastening screw portion of the optical deflector 62 may be positioned beneath the flare beam shielding member 100 and which will result in a situation where it is not possible to remove the optical deflector 62 as long as the flare beam shielding member 100 is being installed.

When the device has such a layout, if a need arises to replace the optical deflector 62, it becomes necessary to remove the flare beam shielding member 100 first. This will result in a low level of working efficiency. The present embodiment aims to solve such a problem.

As shown in FIG. 26, the flare beam shielding member 100 is installed, with a screw 120, onto the cover 88 of the optical housing unit 50 being positioned above the optical deflector 62. With this arrangement, it is possible to solve the problem mentioned above.

The cover 88 may be a cover that is for the purpose of replacing the optical deflector 62 or may be a cover for the optical housing unit 50 as a whole. When the optical deflector 62 needs to be replaced, the cover will be removed first in the replacement process, the flare beam shielding member 100 will be removed at the same time. It is therefore possible to access the optical deflector 62, regardless of how the optical deflector 62 is fastened.

With this arrangement, it is possible to improve the level of working efficiency when a need arises to replace the optical deflector 62 on the market. It is therefore possible to reduce downtimes of the devices.

Because the optical deflector 62 rotates at a high speed, the control substrate 62d and the lower shaft bearing 62h tend to have high temperature. Further, the optical housing unit 50 normally has a tightly-sealed structure in order to ensure protection against dust. Generally speaking, it is therefore a large task to achieve to inhibit the temperature rise of the optical deflector 62.

When the temperatures of the control substrate 62d and the lower shaft bearing 62h rise greatly, the electronic parts may be damaged, or the lives of the electronic parts may be shortened, or, in some cases, the rotation characteristics of the optical deflector 62 may be affected if desired functions of the electronic parts are not achieved. Further, if the temperature of the lower shaft bearing 62h rises drastically, especially if the lower shaft bearing 62h is one with oil dynamic pressure, the life of the shaft bearing may be shortened, or vibrations or abnormal sound may be caused due to oxidation of the oil and a large change in the viscosity of the oil. These situations may result in defects in the overall system.

Figure 10:
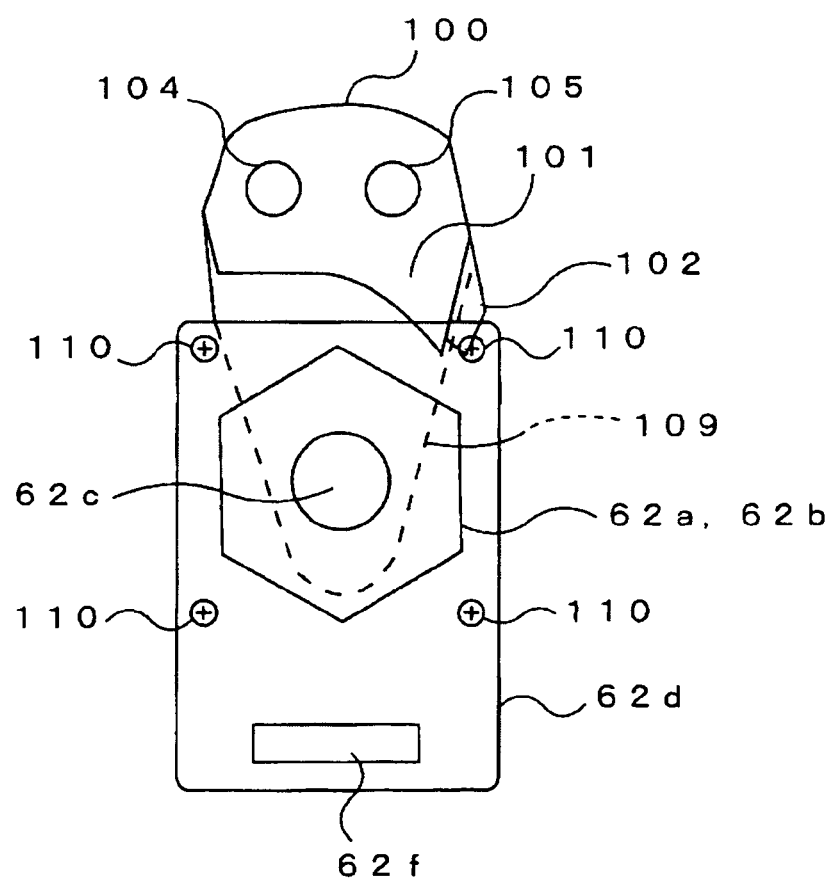
FIG. 10 depicts an arrangement for determining positions of an optical deflector and a flare beam shielding member.

For example, by having an arrangement shown in FIGS. 23 and 24 where the control substrate 62d is fastened with the flare beam shielding member 100, or by having an arrangement shown in FIGS. 10 and 11 where the flare beam shielding member 100 is in close contact with the control substrate 62d and the lower shaft bearing 62h, it is possible to release the heat of the optical deflector 62 into the flare beam shielding member 100. This way, it is possible to use the flare beam shielding member 100 as a heat releasing member.

Because there is a strong air flow generated from the rotation of the polygon mirror near the flare beam shielding member 100, it is possible to achieve the heat releasing effect very efficiently.

It is possible to enhance the effect of cooling down the optical deflector 62 by selecting a material having a high heat conductivity for the material of which the flare beam shielding member 100 is made or having a structure in which a heat-releasing fin is provided at such a position that does not affect the flare beam shielding effect.

With these arrangements, it is possible to efficiently release the heat from the optical deflector 62 in an enclosed space. It is therefore possible to solve the problem mentioned above and to continuously obtain images with high quality without having vibrations or abnormal sound.

Although it is not shown in the drawings, it is possible to achieve the effect of determining the positions, the effect of preventing a mistake of installing the optical deflector 62 without installing the flare beam shielding member 100, and the effect of releasing the heat, all at the same time, by installing the flare beam shielding member 100 on the control substrate 62*d* of the optical deflector 62.

Next, a tenth embodiment of the present invention is described with reference to FIGS. 27 through 29.

Being related to an example shown in FIG. 15, the tenth embodiment is characterized in that a part of at least one of the edge lines of the polygon mirror and the flare beam shielding member is inclined to be substantially parallel to the other of the edge lines. In the example shown in FIG. 15, one of the edge lines is positioned at a torsional angle; however, in the present embodiment, one of the edge lines is inclined, and is not necessarily at a torsional angle.

Figure 27:
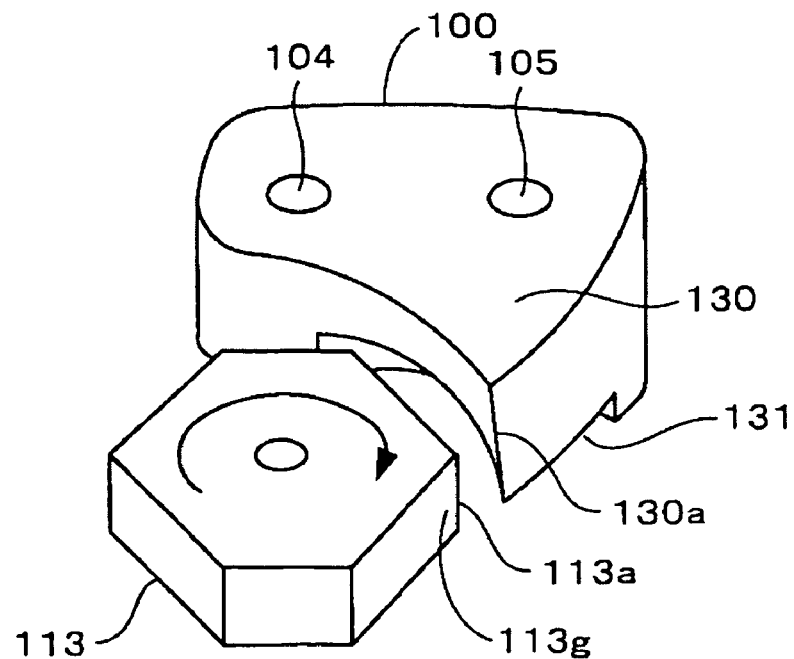
FIG. 27 is a perspective view of a positional relationship between an optical deflector and a flare beam shielding member according to a tenth embodiment.
Figure 28:
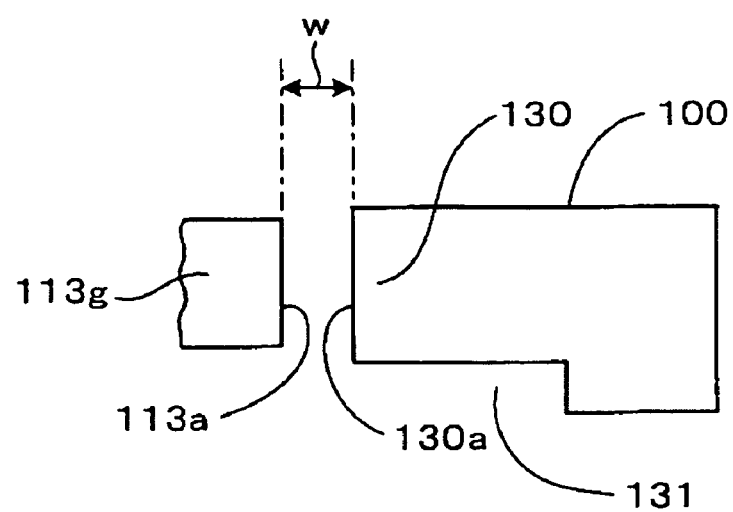
FIG. 28 depicts a short distance in a rotation axial direction of a polygon mirror between an edge line of the polygon mirror and an edge line of a flare beam shielding member shown in FIG. 27.

As shown in FIG. 27, the flare beam shielding member 100 has a single edge line portion 130 and a space 131 provided on the lower surface side. As shown in FIG. 28, an edge line 130*a* of the edge line portion 130 maintains positional relationship so as to be substantially parallel to the edge line 113*a* of the polygon mirror 113 having a single stage. Consequently, the flare beam shielding member 100 keeps a constant distance w for the whole area (the whole width) in the rotation axial direction of the polygon mirror 113.

Figure 29:
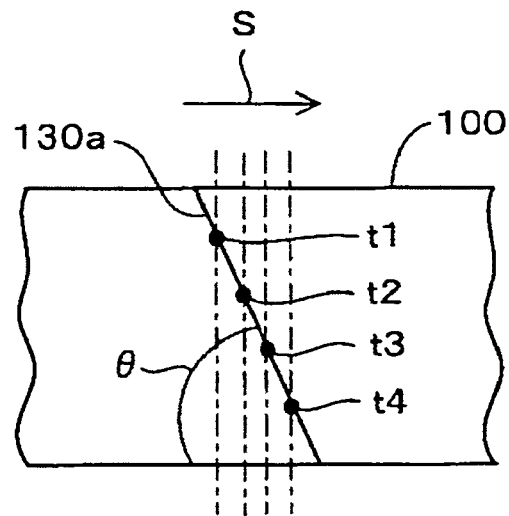
FIG. 29 depicts timings at which the edge line of the polygon mirror passes the edge line of the flare beam shielding member shown in FIG. 27.

As shown in FIG. 29, the edge line 130*a* is inclined at an angle θ so that the lower end protrudes in the rotation direction S of the polygon mirror 113, while remaining substantially parallel to the edge line 113*a* of the polygon mirror 113.

Consequently, the timing at which the edge line 113*a* of the polygon mirror 113 passes the edge line 130*a* of the flare beam shielding member 100 is staggered so as to be at t1, t2, t3, and t4 from the upper side of the edge line 130*a* so that the edge line 113*a* passes the bottom of the edge line 130*a* at last.

With this arrangement, it is possible to reduce the side effects such as noises. In the present example, the polygon mirror 113 having a single stage is used; however, it is possible to achieve the same effect using a polygon mirror having two stages (a plurality of stages). Also, the direction of the inclination of the edge line 130*a* may be opposite.

Further, also with the example shown in FIG. 15, it is possible to achieve the same effect by having the edge lines 101*a* and 102*a* inclined in the same way.

Figure 30:
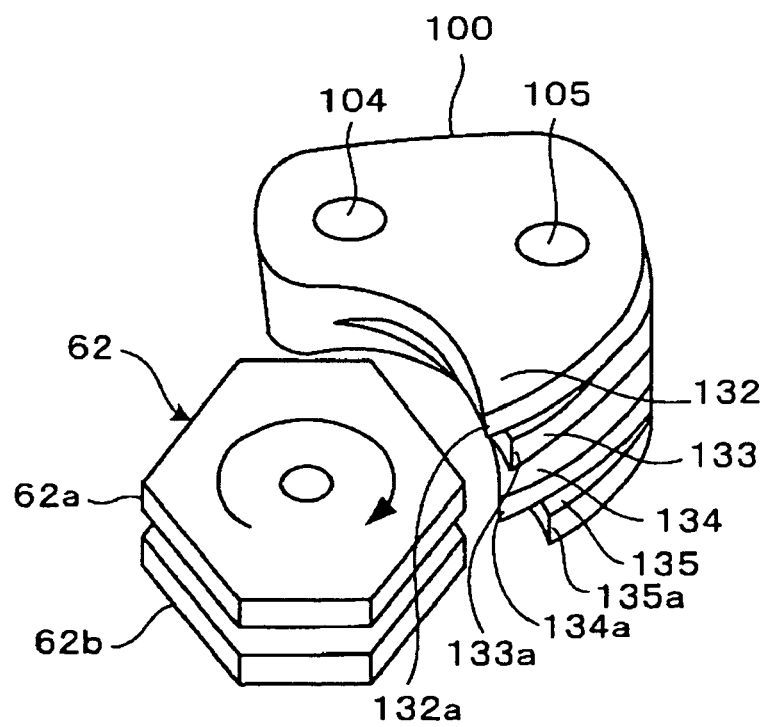
FIG. 30 is a perspective view of a positional relationship between an optical deflector and a flare beam shielding member according to an eleventh embodiment.
Figure 31:
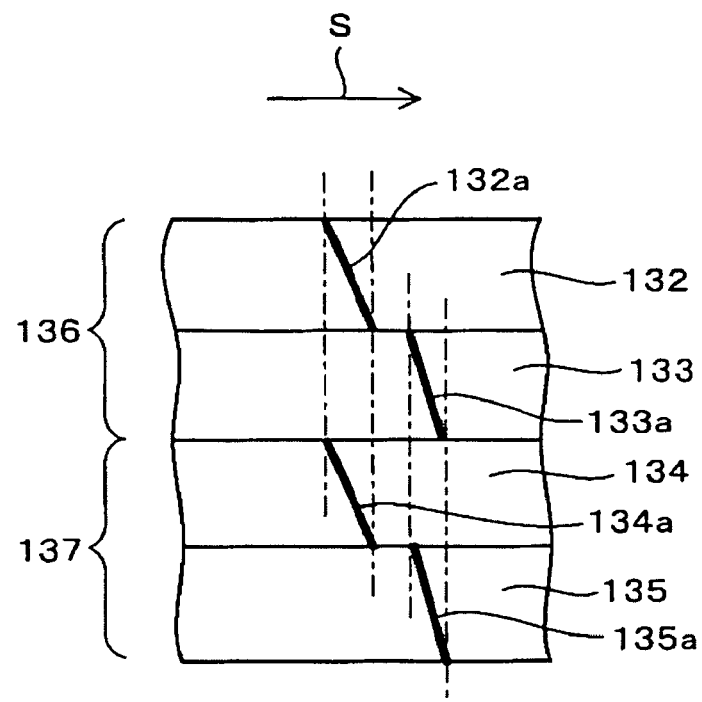
FIG. 31 depicts inclinations and positional relationships between edge lines of the flare beam shielding member shown in FIG. 30.

FIGS. 30 and 31 are drawings for illustrating an eleventh embodiment of the present invention. The flare beam shielding member 100 has an upper shielding unit 136 that corresponds to the polygon mirror 62*a* being the upper stage and a lower shielding unit 137 that corresponds to the polygon mirror 62*b* being the lower stage. The upper shielding unit 136 is made up of a first shielding unit 132 and a second shielding unit 133. The lower shielding unit 137 is made up of a third shielding unit 134 and a fourth shielding unit 135.

Like in the first embodiment, in the upper shielding unit 136, the first shielding unit 132 and the second shielding unit 133 are out of alignment with each other substantially in the rotation direction of the polygon mirrors 62*a* and 62*b*, within a plane that orthogonally intersects the rotation axis of the polygon mirrors 62*a* and 62*b*. In the lower shielding unit 137, the third shielding unit 134 and the fourth shielding unit 135 are out of alignment with each other substantially in the rotation direction of the polygon mirrors 62*a* and 62*b*, within a plane that orthogonally intersects the rotation axis of the polygon mirrors 62*a* and 62*b*.

As shown in FIG. 31, the edge line 132*a* of the first shielding unit 132, the edge line 133*a* of the second shielding unit 133, the edge line 134*a* of the third shielding unit 134, and the edge line 135*a* of the fourth shielding unit 135 are inclined so that the lower ends protrude in the rotation direction S of the polygon mirrors 62*a* and 62*b*, while remaining substantially parallel to the edge lines of the polygon mirror 62*a* and 62*b*.

The edge line 132*a* of the first shielding unit 132 and the edge line 134*a* of the third shielding unit 134 are not out of alignment with each other in the rotation direction S of the polygon mirrors 62*a* and 62*b*. The edge line 133*a* of the second shielding unit 133 and the edge line 135*a* of the fourth shielding unit 135 are not out of alignment with each other in the rotation direction S of the polygon mirrors 62*a* and 62*b*, either.

Consequently, the upper shielding unit 136 and the lower shielding unit 137 are not out of alignment with each other substantially in the rotation direction of the polygon mirrors 62*a* and 62*b* within a plane that orthogonally intersects the rotation axis of the polygon mirrors 62*a* and 62*b*. According to the present embodiment, it is possible to achieve the same effect as according to the tenth embodiment. The directions of the inclinations of the edge lines may be opposite. Not all the edge lines have to be inclined in the same direction.

Further, the polygon mirror may be structured to have a single stage.

[Noise Evaluation]

Figure 32:
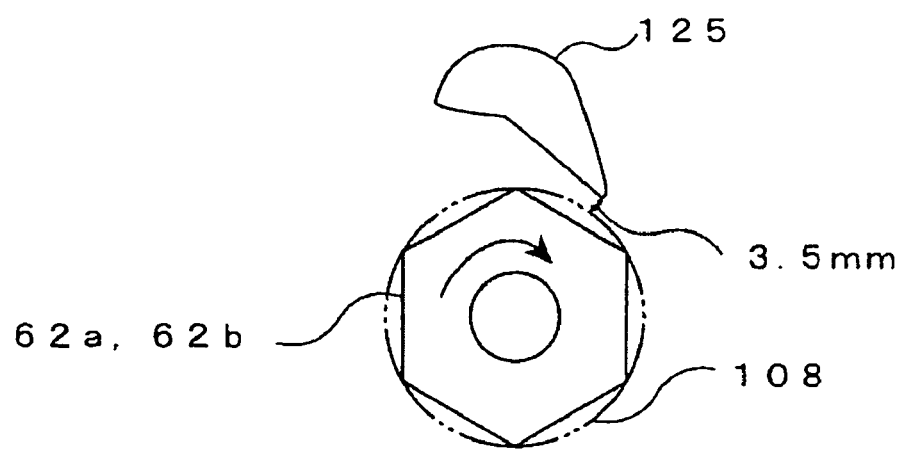
FIG. 32 is a plan view of a conventional flare beam shielding member and a conventional polygon mirror to be compared in noise evaluation.

Noise evaluation tests were performed with the flare beam shielding member according to embodiments of the present invention. The flare beam shielding member 100 that is shown in FIG. 5, for example, according to the first embodiment was used in the evaluation tests. A flare beam shielding member 125 shown in FIG. 32 was used in comparison.

The flare beam shielding member 125 has a conventional shape so that the whole width of the edge line portion of the flare beam shielding member 125 in the secondary scanning direction and an edge portion of the polygon mirror pass each other.

With respect to the rotation circumference 108 of the polygon mirror shown in FIG. 8, the flare beam shielding member 100 according to the present embodiment has the edge line portion 101*b* having a distance D of 3.5 millimeters and the edge line portion 102*b* having a distance E of 6.3 millimeters. In the comparison example, the shortest distance between the flare beam shielding member 125 and the rotation circumference 108 of the polygon mirror is 3.5 millimeters. The testing conditions were as follows:

Testing Devices:
A microphone MI-3220 manufactured by Ono Sokki
An FFT analyzer CF-5220 manufactured by Ono Sokki Testing Environment:
In an acoustic laboratory
Normal temperature Testing Conditions:
Position of measurement: 200 millimeters above the optical scanning device
Number of revolutions of the polygon motor: 36378 revolutions per minute (rpm)

Firstly, in order to generally find out the source of noises, analysis was made in a third octave band. When a flare beam shielding member was installed, the increase in the overall noise was small, however, the increase in a component in the range from 3.15 kilohertz to 4 kilohertz was prominent. At the same time, the volume of harsh noise (high piercing noise) became larger. We therefore conjectured that this component was the source of the noises.

As for the component in the range from 3.15 kilohertz to 4 kilohertz which we conjectured as the source of the noises, we performed a frequency analysis with a higher resolution (i.e. FFT analysis).

According to the result of the analysis, the components that increased prominently due to installation of a flare beam shielding member were 3638 hertz and 7263 hertz. These frequency numbers coincide with a number obtained by "the number of the revolutions of the polygon motor"×6 (36378 [rpm]/60×6 [faces]) and the double of the number, respectively.

From this analysis, it has been confirmed that the noises increased due to the increases in the whistling noise from the polygon mirror and the secondary component of this noise.

Although it has been confirmed that the harsh noise (the high piercing noise) was the whistling noise from the polygon mirror and the secondary component of this noise, we performed a sound quality evaluation of the noise data recorded when the noises were measured using actual machines, with an acoustic analyzing system in order to further support the confirmation.

In order to perform this evaluation, we filtered the recorded noise data to exclude the polygon whistling frequency (i.e. 3638 hertz) and the secondary component (7263 hertz) so that the noises from which only these frequencies were eliminated were played back and used to confirm the results.

When we compared the noises that were filtered to exclude 3638 hertz and 7263 hertz and the noises that were not filtered, the difference between the filtered noises and the unfiltered noises was very distinctive for both of the frequencies. Consequently, we were able to support the confirmation that the noises were at these frequencies.

Figure 33:
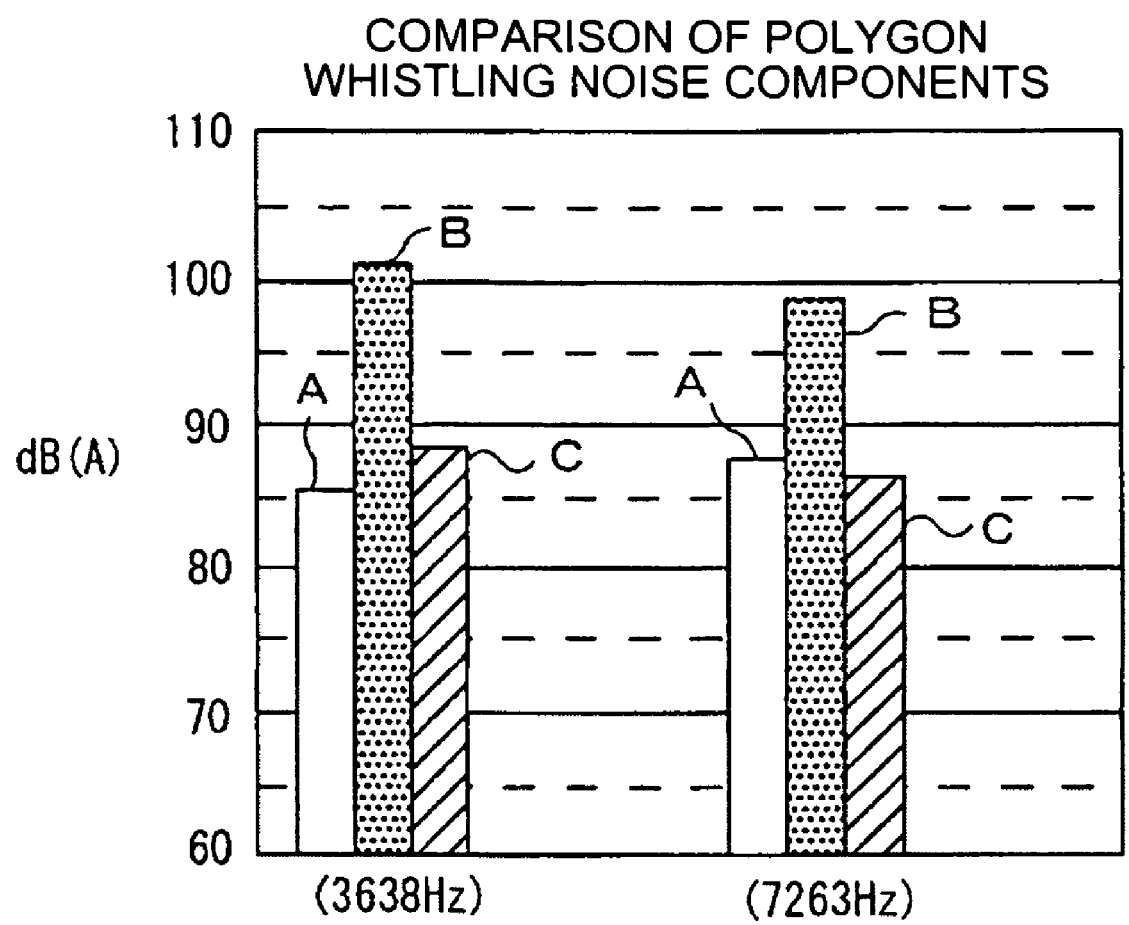
FIG. 33 is a comparison graph of whistling noise components from polygon mirrors in the noise evaluation.

The results of the FFT analysis for comparing the noise components are shown in FIG. 33. In FIG. 33, A stands for an example in which no flare beam shielding member is installed; B stands for an example in which the flare beam shielding member 125 is installed; and C stands for an example in which the flare beam shielding member 100 is installed.

As apparent from FIG. 33, when the flare beam shielding member 100 according to the present embodiment is used, it has been confirmed that the noise can be reduced by a greater amount than when "the whole width of the edge line portion is passed". Also, in terms of the level of sensory noises, a great improvement is achieved.

Figure 34:
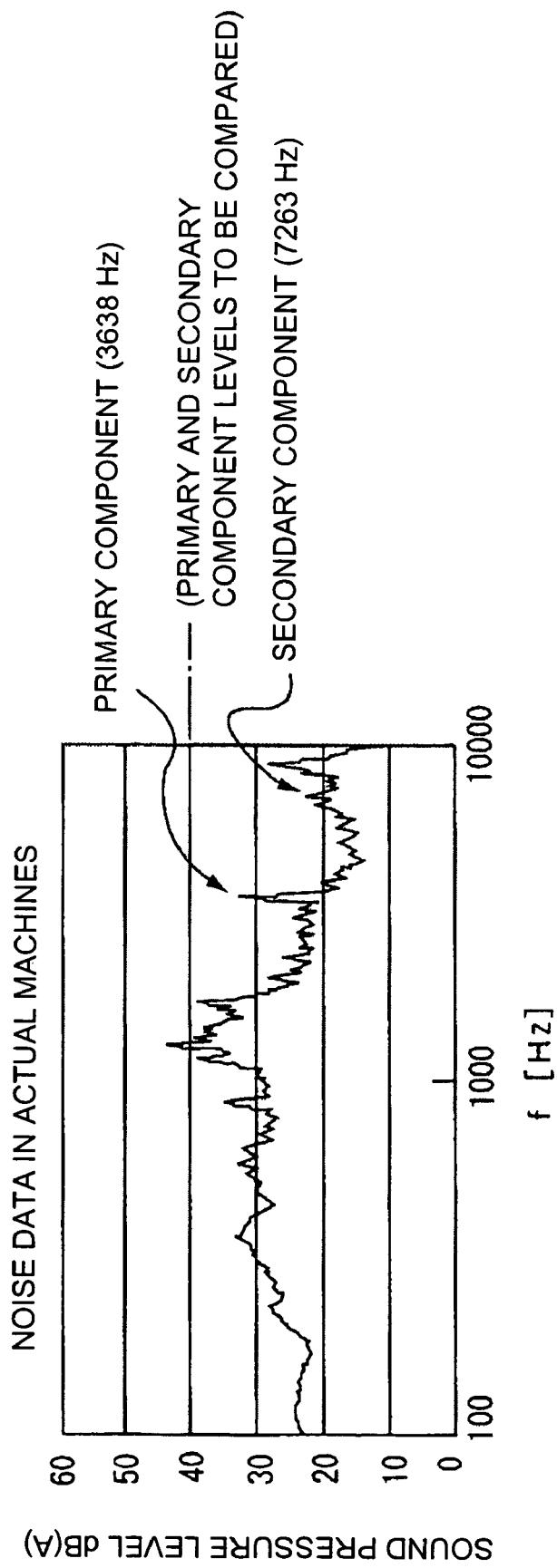
FIG. 34 is a graph depicting noise data from a flare beam shielding member in the noise evaluation.

The noise data shown in FIG. 34 (the data from an actual machine with the flare beam shielding member 100) was played back in the acoustic analyzing system. Further, the noises were compared after filtering to eliminate the primary component and the secondary component, respectively.

According to the results of the comparison, the difference between the filtered noise and the unfiltered noise was audible for the primary component; however, there was no sensory difference for the secondary component. Accordingly, it is understood tat when the flare beam shielding member 100 of the present embodiment is used, the secondary component is sufficiently reduced from the noises in the actual machine. The primary component is also lower by a sufficient amount than a level of the example used in the comparison (approximately 40 decibel).

The reduction in the noise mentioned above denotes a reduction in air resistance (air friction) between the polygon mirror and the flare beam shielding member 100. Consequently, it is possible to inhibit, at the same time, the temperature rise caused by air friction resulting from the high-speed rotations of the polygon mirror. This effect contributes to inhibition of a temperature rise within the optical housing unit 50.

In the embodiments described above, a flare beam shielding member is used in the explanation; however, the present invention is not limited to this example. The present invention may be embodied with other parts that are disposed so as to be close to an optical deflector due to the layout inside an optical housing unit. Also in such embodiments with other parts, it is possible to achieve the same or similar effects of reducing the noises and the like.

According to the present invention, it is possible to reduce the increase in noises, occurrence of abnormal sound, prevent an increase the temperature, maintain deflection stability, as well as to maintain high image quality, while maintaining the inherent functions of the flare beam shielding member.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
   a deflector configured to deflect a light flux emitted from a light source in a scanning plane perpendicular to an axis of rotation of the deflector, the deflector including a plurality of deflection surfaces and a plurality of first edges between the deflection surfaces;
   an optical system configured to direct the deflected light flux onto a subject surface; and
   a comma-shaped shielding member disposed close to the deflector, wherein
   the deflector includes an upper stage and a lower stage, and is configured such that each of a plurality of light beams meets a surface of the upper stage, or the lower stage, of the deflector at an angle that is perpendicular to the axis of rotation of the deflector;
   the optical system includes an upper layer lens corresponding to the upper stage of the deflector, and a lower layer lens corresponding to the lower stage of the deflector; and
   the comma-shaped shielding member includes a pointy forked portion extending parallel to the scanning plane towards the deflector from a column-shaped body of the comma-shaped shielding member, the pointy forked portion including
   an upper pointy shielding part corresponding to the upper stage of the deflector and having an upper edge line portion with an upper edge line substantially parallel to the axis of rotation of the deflector, and
   a lower pointy shielding part corresponding to the lower stage of the deflector and having a lower edge line portion, disposed below the upper edge line portion, with a lower edge line substantially parallel to the axis of rotation of the deflector and out of alignment with the upper edge line in the scanning plane,
   so that one of the plurality of first edges of the deflector does not pass the upper and lower edge lines of the comma-shaped shielding member in the scanning plane simultaneously, the upper pointy shielding part and the lower pointy shielding part configured to shield flare beams reflected by the upper layer lens and the lower layer lens, respectively.

2. The optical scanning device according to claim 1, further comprising:
a plurality of light sources; and
a plurality of optical systems,
wherein the comma-shaped member prevents a flare beam reflected by one of the optical systems from entering another one of the optical systems.

3. The optical scanning device according to claim 2, wherein
the deflector includes a plurality of stages, and the comma-shaped shielding member includes a plurality of shielding parts, each edge line portion of the plurality of shielding parts close to each of the stages arranged at different positions.

4. The optical scanning device according to claim 1, wherein the upper and lower edge line portions include a space therebetween.

5. The optical scanning device according to claim 1, wherein
the upper and lower edge line portions are at a torsional angle with the plurality of first edges.

6. The optical scanning device according to claim 1, wherein
the upper pointy shielding part is arranged at a counter position with respect to a rotation direction of the deflector; and
the lower pointy shielding part is located at an anti-counter position with respect to the rotation direction of the deflector.

7. The optical scanning device according to claim 1, wherein
a shortest distance between the upper edge line portion of the upper pointy shielding part and the plurality of first edges is different from a shortest distance between the lower edge portion of the lower pointy shielding part and the plurality of first edges.

8. The optical scanning device according to claim 1, wherein
at least one of the upper edge line is longer than the plurality of first edges of the upper stage of the deflector and the lower edge line is longer than the plurality of first edges of the lower stage of the deflector.

9. The optical scanning device according to claim 1, wherein at least one of the upper and lower edge line portions is any one of a curved shape and a chamfered shape.

10. The optical scanning device according to claim 1, wherein at least one of the upper and lower edge line portions is a curved shape in a cross section in a rotation direction of the deflector.

11. The optical scanning device according to claim 1, wherein
the deflector includes a plurality of stages of mirrors, and phases of reflection faces of a mirror of the plurality of stages of mirrors are out of alignment with another mirror of the plurality of stages of mirrors in a rotation direction of the deflector.

12. The optical scanning device according to claim 1, wherein
the comma-shaped shielding member functions as an aperture that adjusts shapes of the light flux.

13. The optical scanning device according to claim 1, wherein
a downstream side of the upper and lower edge line portions of the comma-shaped shielding member, in a direction of rotation of the deflector, is a curvature shape that reduces resistance from an air flow caused after one of the plurality of first edges passes.

14. The optical scanning device according to claim 1, further comprising:
a housing unit configured to house the comma-shaped shielding member, wherein
the comma-shaped shielding member is structurally independent of the housing unit.

15. The optical scanning device according to claim 1, further comprising:
a housing unit configured to house the comma-shaped shielding member, wherein
a position determining portion, common to the deflector and the comma-shaped shielding member, is used when attaching the deflector to the housing unit.

16. The optical scanning device according to claim 1, wherein
the comma-shaped shielding member has a function of installing the deflector.

17. The optical scanning device according to claim 1, further comprising:
a housing unit configured to house the comma-shaped shielding member; and
a cover positioned above the deflector and attached to the housing unit, wherein
the comma-shaped shielding member is attached to the cover.

18. The optical scanning device according to claim 1, wherein
the comma-shaped shielding member functions as a heat releasing member for the deflector.

19. The optical scanning device according to claim 1, wherein
the comma-shaped shielding member is installed on the deflector.

20. An image forming apparatus comprising the optical scanning device according to claim 1.

21. An optical scanning device, comprising:
a deflector including a plurality of deflection surfaces and a plurality of first edges between the deflection surfaces;
an optical system including an upper layer lens corresponding to an upper stage of the deflector, and a lower layer lens corresponding to a lower stage of the deflector;
and
a comma-shaped shielding member disposed close to the deflector, wherein
the deflector includes the upper stage and the lower stage, and is configured such that each of a plurality of light beams meets a surface of the upper stage, or the lower stage, of the deflector at an angle that is perpendicular to an axis of rotation of the deflector; and
the comma-shaped shielding member includes a pointy forked portion extending parallel to the scanning plane towards the deflector from a column-shaped body of the comma-shaped shielding member, the pointy forked portion including
an upper pointy shielding part corresponding to the upper stage of the deflector and having an upper edge line portion with an upper edge line substantially parallel to the axis of rotation of the deflector, and a lower pointy shielding part corresponding to the lower stage of the deflector and having a lower edge line portion, disposed below the upper edge line portion, pg,63 with a lower edge line substantially parallel to the axis of rotation of the deflector and out of alignment with the upper edge line in the scanning plane, so that one of the plurality of first edges of the deflector does not pass the upper and lower edge lines of the comma-shaped shielding member in the scanning plane simultaneously, the upper pointy shielding part and the lower pointy shielding part configured to shield flare beams reflected by the upper layer lens and the lower layer lens, respectively.

22. The optical scanning device according to claim 1, wherein the upper pointy shielding part and the lower pointy shielding part are parallel to each other, and overlap in a direction parallel to the axis of rotation of the deflector.

23. The optical scanning device according to claim 21, wherein the optical scanning device includes the upper pointy shielding part and the lower pointy shielding part that are parallel to each other, and that overlap in a direction parallel to the axis of rotation of the deflector.

* * * * *